US012392727B2

(12) United States Patent
Pollak et al.

(10) Patent No.: US 12,392,727 B2
(45) Date of Patent: Aug. 19, 2025

(54) SYSTEM FOR ANALYZING A COMPOSITE OBJECT IN AN IMAGE TO DETERMINE RING CHARACTERISTICS USING STAGED MACHINE LEARNING MODELS

(71) Applicant: ENGAGE Jeweler, LLC, Denver, CO (US)

(72) Inventors: Michael Pollak, Denver, CO (US); Artur Kiulian, Los Angeles, CA (US)

( * ) Notice: Subject to any disclaimer, the term of this patent is extended or adjusted under 35 U.S.C. 154(b) by 965 days.

(21) Appl. No.: 17/515,120

(22) Filed: Oct. 29, 2021

(65) Prior Publication Data

US 2022/0163455 A1 May 26, 2022

Related U.S. Application Data

(60) Provisional application No. 63/117,309, filed on Nov. 23, 2020.

(51) Int. Cl.
| | | |
|---|---|---|
| G01N 21/87 | (2006.01) | |
| G06F 18/23 | (2023.01) | |
| G06F 18/2413 | (2023.01) | |
| G06N 3/08 | (2023.01) | |
| G06Q 30/0601 | (2023.01) | |
| G06T 7/00 | (2017.01) | |
| G06T 7/70 | (2017.01) | |
| G06V 20/66 | (2022.01) | |

(52) U.S. Cl.
CPC ............. *G01N 21/87* (2013.01); *G06F 18/23* (2023.01); *G06F 18/2413* (2023.01); *G06N 3/08* (2013.01); *G06Q 30/0627* (2013.01); *G06Q 30/0641* (2013.01); *G06T 7/0002* (2013.01); *G06T 7/70* (2017.01); *G06V 20/66* (2022.01); *G06T 2207/20081* (2013.01); *G06T 2207/30108* (2013.01)

(58) Field of Classification Search
None
See application file for complete search history.

(56) References Cited

U.S. PATENT DOCUMENTS 7,136,154 B2 11/2006 Bray
8,189,875 B2 5/2012 Nasser
(Continued)

FOREIGN PATENT DOCUMENTS

| CN | 106650643 | 5/2017 |
| KR | 101249537 | 5/2013 |

OTHER PUBLICATIONS

Anithal, "Application of digital image processing in the determination of mass of the diamonds," International Journal of Computer Systems Science & Engineering, vol. 28, No. 5, Sep. 2013.

(Continued)

*Primary Examiner* — Helen Zong
(74) *Attorney, Agent, or Firm* — Brownstein Hyatt Farber Schreck, LLP

(57) ABSTRACT

Users may provide images to the ring selection system via a ring selection interface of a client application. The ring selection system may analyze the images using one or more machine learning models to determine ring characteristics of rings depicted in the images. The ring selection system may determine a set of ring listings having the determined ring characteristics and display the set of ring listings in the ring selection interface.

20 Claims, 25 Drawing Sheets

(56) References Cited

U.S. PATENT DOCUMENTS

| | | | | |
|---|---|---|---|---|
| 8,543,658 | B2* | 9/2013 | Muthyala | G06Q 30/0621 |
| | | | | 709/219 |
| 9,165,318 | B1 | 10/2015 | Pauley | |
| 10,410,056 | B1* | 9/2019 | Bermudez | G06V 20/10 |
| 11,243,532 | B1* | 2/2022 | Levihn | G06N 3/045 |
| 2005/0261989 | A1* | 11/2005 | Vadon | G06Q 30/0627 |
| | | | | 705/27.2 |
| 2008/0212899 | A1* | 9/2008 | Gokturk | G06Q 30/0603 |
| | | | | 382/305 |
| 2011/0060655 | A1 | 3/2011 | Novak | |
| 2016/0320312 | A1 | 11/2016 | Kolomenkin | |
| 2017/0161808 | A1* | 6/2017 | Opperman | G06F 18/22 |
| 2019/0210067 | A1 | 7/2019 | Kumar | |
| 2019/0213655 | A1 | 7/2019 | Watkins | |
| 2020/0041419 | A1* | 2/2020 | Pollak | G06Q 50/01 |
| 2020/0050834 | A1 | 2/2020 | Niskanen | |
| 2022/0147050 | A1* | 5/2022 | Cheng | G06V 10/751 |

OTHER PUBLICATIONS

Hurtik et al., "An image recognition approach to classification of jewelry store defects," Institute for Research and Applications of Fuzzy Modeling, Jun. 2013.

* cited by examiner

SYSTEM FOR ANALYZING A COMPOSITE OBJECT IN AN IMAGE TO DETERMINE RING CHARACTERISTICS USING STAGED MACHINE LEARNING MODELS

CROSS-REFERENCE TO RELATED APPLICATION

This application is a nonprovisional patent application of and claims the benefit of U.S. Provisional Patent Application No. 63/117,309, filed Nov. 23, 2020 and titled "DETERMINING RING CHARACTERISTICS BASED ON AN IMAGE USING MULTIPLE MACHINE LEARNING MODELS," the disclosure of which is hereby incorporated herein by reference in its entirety.

FIELD

The described embodiments relate generally to systems and graphical interfaces for determining ring characteristics from images. More particularly, the present embodiments relate to a system and graphical interface for analyzing images using staged machine learning models to determine ring characteristics and providing ring listings corresponding to the determined ring characteristics.

BACKGROUND

Purchasers of jewelry often find that there are many options for types and styles of jewelry. Often, an early step in the purchasing process is determining which types and styles to consider in more detail. Traditional methods for online jewelry shopping often require that users perform a search by specifying attributes of stones, settings, and other components of a jewelry item. Many purchasers of jewelry know what the item of jewelry they want looks like, but are unfamiliar or unable to determine the attributes for searching that correspond to the appearance of the item.

Additionally, automatic detection and classification of jewelry, particularly composite items that include multiple components (e.g., a stone and setting), is particularly difficult and unreliable. Specifically, traditional image recognition techniques are typically unable to reliably identify characteristics or properties of a piece of jewelry, particularly when analyzed as part of a snapshot or image of a broader composition containing multiple objects and elements.

SUMMARY

A diamond selection system is provided for analyzing images using machine learning models to determine ring characteristics and providing ring listings corresponding to the determined ring characteristics.

An example embodiment may include a computer-implemented method for extracting sets of characteristics for a composite object. The method may include the steps of providing, at a client application, a ring selection interface accessible by a client device and receiving, via the ring selection interface, a request to view listings of a ring selection system that correspond to a composite object displayed in an image. The image may include multiple objects and the composite object may include a stone and a setting. The request may include an image universal resource locator (URL). The method may further include the steps of, in response to receiving the request, obtaining the image using the image URL and processing the image using a ring identification service to determine ring characteristics of the composite object. Processing the image may include defining, using a stone-locating machine learning model deployed to the ring identification service, a first bounding box that surrounds a stone portion of the image and determining a set of stone characteristics by applying a stone-classifying machine learning model deployed to the ring identification service to contents of the first bounding box. Processing the image may further include defining, using a setting-locating machine learning model deployed to the ring identification service, a second bounding box that surrounds a setting portion of the image and determining a set of setting characteristics by applying a setting-classifying machine learning model deployed to the ring identification service to contents of the second bounding box. The method may further include determining a set of ring listings using the set of stone characteristics and the set of setting characteristics and displaying at least a portion of the set of ring listings in the ring selection interface.

Another example embodiment may include a ring selection system for providing a ring listing that corresponds to a composite object in an image. The ring selection system may include a host service, a model service, and a ring identification service. The host service may be configured to execute multiple instances of a client application. Each instance of the client application may be configured to provide a ring selection interface accessible at a client device. The host service may be further configured to receive, via the ring selection interface, a request to view listings of the ring selection system that correspond to the composite object in an image. The composite object may comprise a ring. The ring may comprise a stone depicted in a stone portion of the image and a setting depicted in a setting portion of the image. The model service may be configured to implement a set of machine learning models as separate containers. The ring identification service may be operably coupled to the host service and the model service, and may be configured to obtain the image. The ring identification service may be further configured to transmit a first request to the model service to deploy a stone-locating machine learning model of the set of machine learning models to the ring identification service and define, using the stone-locating machine learning model, a first bounding box that surrounds the stone portion of the image. The ring identification service may be further configured to transmit a second request to the model service to deploy a setting-locating machine learning model of the set of machine learning models to the ring identification service and define, using the setting-locating machine learning model, a second bounding box that surrounds the setting portion of the image. The ring identification service may be further configured to transmit a third request to the model service to deploy a stone-classifying machine learning model of the set of machine learning models to the ring identification service and apply the stone-classifying machine learning model to contents of the first bounding box to determine a set of stone characteristics. The ring identification service may be further configured to transmit a fourth request to the model service to deploy a setting-classifying machine learning model of the set of machine learning models to the ring identification service and apply the setting-classifying machine learning model to contents of the second bounding box to determine a set of setting characteristics. The host service may be further configured to determine, based on the set of stone characteristics and the set of setting characteristics, a set of ring listings for presentation in the ring selection interface and cause at least a portion of the set of ring listings to be displayed in the ring selection interface.

Yet another example embodiment may include a method for identifying a composite object in an image. The method may include the step of providing, at a client application, a ring selection interface accessible by a client device. The method may further include the step of receiving, via the ring selection interface, an image depicting the composite object. The composite object may include a ring comprising a stone and a setting. The image may include a stone portion corresponding to the stone and a setting portion corresponding to the setting. The method may further include the step of receiving, via the ring selection interface, a request to view, in the ring selection interface, one or more listings of a ring selection system that match the ring. The method may further include the steps of deploying a stone-locating machine learning model to a ring identification service of the ring selection system and applying the stone-locating machine learning model to the image to define a first bounding box that surrounds the stone portion of the image. The method may further include the steps of deploying a setting-locating machine learning model to the ring identification service and applying the setting-locating machine learning model to the image to define a second bounding box that surrounds the setting portion of the image. The method may further include the steps of deploying a stone-classifying machine learning model to the ring identification service and applying the stone-classifying machine learning model to the contents of the first bounding box to determine a stone shape of the stone. The method may further include the steps of deploying a setting-classifying machine learning model to the ring identification service and applying the setting-classifying machine learning model to the contents of the second bounding box to determine a setting style of the setting. The method may further include the steps of determining a set of ring listings for presentation in the ring selection interface, the ring listings corresponding to rings having the stone shape and the setting style and displaying at least a portion of the set of ring listings in the ring selection interface.

BRIEF DESCRIPTION OF THE DRAWINGS

The disclosure will be readily understood by the following detailed description in conjunction with the accompanying drawings, wherein like reference numerals designate like elements.

Figure 1A:
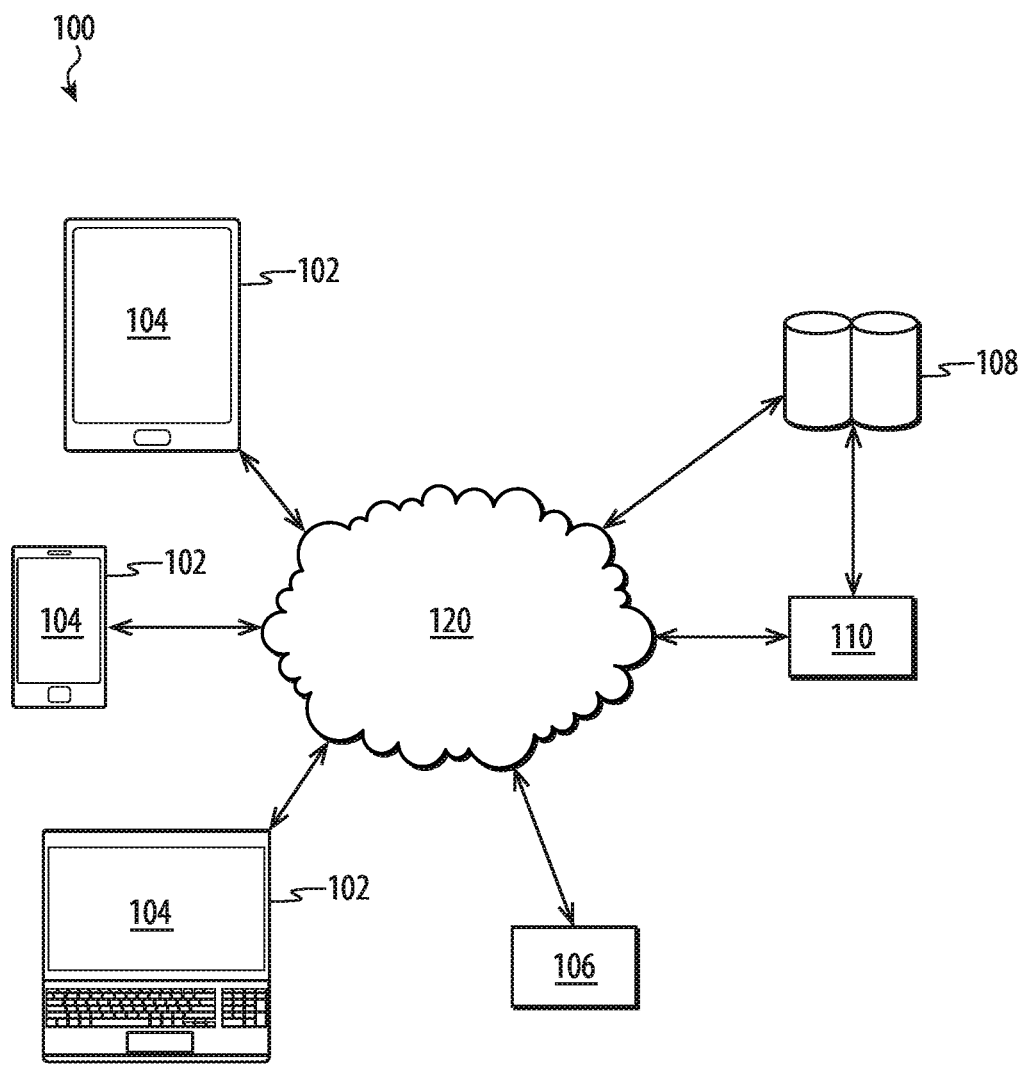
FIG. 1A depicts an example system for implementing a ring selection system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The embodiments described herein are generally directed to providing ring listings to users of a ring selection system. Users may provide images that depict one or more composite objects, such as rings, to the ring selection system via a ring selection interface of a client application. The ring selection system may analyze the images using one or more machine learning models to determine characteristics of the composite objects depicted in the images. The ring selection system may determine a set of item listings (e.g., ring listings) having the determined characteristics and display the set of listings in the ring selection interface.

As used herein, "composite object" may refer to any object that includes multiple distinct components or elements, including a ring with a stone and a setting, other pieces of jewelry with multiple components, and the like. While the embodiments described herein reference rings, this disclosure is not limited to rings, and may include other types of jewelry (e.g., earrings, bracelets, watches, necklaces, pendants, and the like) and/or other retail items and other goods offered for sale.

Each composite object may include one or more characteristics. For example, each ring may have associated ring characteristics that describe the ring and, in some cases, may be used to distinguish the stone from other rings. In some cases, each component of a composite object may include characteristics. For example, ring characteristics may include stone characteristics and setting characteristics. Each stone may have associated stone characteristics that describe the stone and, in some cases, may be used to distinguish the stone from other stones. Stone characteristics may include gemological features (e.g., shape, cut, color, clarity, carat weight, symmetry, polish, fluorescence, etc.), price, certification information, related data, and the like. Similarly, each setting may have associated setting characteristics that describe the setting and, in some cases, may be used to distinguish the stone from other settings. Setting characteristics may include a setting style (bezel set, halo, modern, pave, side stones, solitaire, three stone, two stone, vintage, etc.), band material(s) (e.g., white gold, yellow gold, platinum, etc.), price, and the like. Other composite objects may have similar dual sets of characteristics.

The ring selection system may receive an image, for example via a ring selection interface presented on a client application operating on a client device. The image may include a ring (or other composite object) for identification. In some cases, the image includes only a ring. In some cases, the image may be a broad composition image that includes other objects or environment in addition to the ring. For example, the image may include a ring along with other non-jewelry or non-ring objects as part of a natural setting or environment. A ring identification service may apply one or more machine learning models to the image to identify the ring depicted in the image and determine ring characteristics of the ring. A host service may use the determined ring characteristics to determine a set of ring listings. The host service may provide the set of ring listings to the client application for presentation to the user. Feedback service(s) of the ring selection system may receive model performance data from the ring identification service, and may provide aggregated model performance data and/or performance metrics to the ring selection system for use in selecting or improving models.

Identifying and determining characteristics of rings or other composite objects depicted in images presents numerous challenges. In different images, and particularly in broad composition images that include other objects (e.g., non-jewelry objects) and/or environment in addition to a ring or jewelry item, it may be particularly difficult to identify and distinguish rings from other objects. Additionally, a candid setting or broad composition may depict a piece of jewelry at an angle or orientation that is sub-optimum for identifying the jewelry using traditional techniques. Identifying characteristics of composite objects that include multiple elements, such as rings, may present additional challenges. Composite objects, including rings, may include multiple elements that are not spatially distinct and/or have complex overlapping regions when captured in photographs and images. Additionally, such objects may be viewed and/or photographed from a variety of angles. These challenges mean that traditional image analysis is often unreliable in identifying characteristics of rings or other composite objects depicted in images.

In some cases, the ring identification service may use staged machine learning models which may include four or more machine learning models for identification of one or more rings or other composite objects in an image. The models may include a stone-locating machine learning model, a setting-locating machine learning model, a stone-classifying machine learning model, and a setting-classifying machine learning model. The stone-locating machine learning model and the setting-locating machine learning model may be used to determine locations of a stone and a setting depicted in an image, respectively. The stone-classifying machine learning model may be used to determine stone characteristics of the stone depicted in the image, and the setting-classifying machine learning model may be used to determine setting characteristics of the setting depicted in the image.

In various embodiments, one or more of the machine learning models may be applied to images in parallel, which facilitates scalability and computational efficiency of the system to provide robust results in real-time or near real-time. Additionally or alternatively, the ring identification service may use dedicated physical resources or other discrete portions of the ring selection system for each machine learning model, which allows for further scalability and computational efficiency.

The determined ring characteristics may be used as search parameters to obtain a set of ring listings for presentation via the ring selection interface presented by the client application. In various embodiments, users may provide feedback regarding presented ring listings. The ring selection system may use the feedback to update and/or modify the search parameters and determine a new set of ring listings for presentation.

These and other embodiments are discussed below with reference to FIGS. 1A-13. However, those skilled in the art will readily appreciate that the detailed description given herein with respect to these figures is for explanatory purposes only and should not be construed as limiting.

FIG. 1A depicts an example system 100 for implementing a ring selection system, as described herein. As shown in FIG. 1A, the system 100 includes a ring selection system 110 that is operably coupled to other devices via a network 120. The system 100 may further include client devices 102, which may access the ring selection system 110 using a ring selection interface presented by a client application 104.

Generally, the client application 104 is an application or software program executed on and/or accessible by a client device 102. The client application 104 provides a ring selection interface for a user to access the ring selection system 110. The client application 104 may present ring listings to users of the ring selection system 110. A ring listing may contain information regarding a ring associated with the ring selection system 110, such as a ring that is available for purchase by users of the ring selection system. In some cases, a ring includes a stone and a setting. Stones may be any suitable synthetic or natural gemological stones, including diamonds, rubies, emeralds, and the like. Settings typically hold one or more stones and include a band for placing the ring around a wearer's finger.

Each ring may have associated ring characteristics that describe the ring and, in some cases, may be used to distinguish the stone from other rings. Ring characteristics may include stone characteristics and setting characteristics. Each stone may have associated stone characteristics that describe the stone and, in some cases, may be used to distinguish the stone from other stones. Stone characteristics may include gemological features (e.g., shape, cut, color, clarity, carat weight, symmetry, polish, fluorescence), price, certification information, related data, and the like. Similarly, each setting may have associated setting characteristics that describe the setting and, in some cases, may be used to distinguish the stone from other settings. Setting characteristics may include a setting style (bezel set, halo, modern, pave, side stones, solitaire, three stone, two stone, vintage, etc.), band material(s) (e.g., white gold, yellow gold, platinum, metal alloys), price, and the like.

In some cases, a ring presented in a ring listing may be a combination of one or more stone listings with a setting listing. As such, ring characteristics for a ring listing may be a combination of the stone characteristics of the stone(s) and the setting characteristics of the setting. The ring selection system 110 may be operably connected to one or more databases 108 that store information relating to ring listings, stone listings, and/or setting listings. Each listing may be entered into the database(s) 108 as an electronic record having searchable categories and/or fields representing stone characteristics and/or setting characteristics.

In some cases, the ring selection system 110 may communicate with one or more third-party systems 106 connected to or otherwise in communication with the network 120. In some cases, a third-party system 106 may include a computing network associated with jewelry vendors, such as ring or diamond vendors. The jewelry vendors may be associated with the ring selection system 110, or the jewelry vendors may be competitors or otherwise not associated with the ring selection system 110. In some embodiments, a third-party system 106 may provide ring listings to be included in the database 108 or may provide a distinct database or computer storage system that is otherwise searchable by the ring selection system 110. In some cases, the ring selection system 110 may interface with a third-party system 106 to find ring information for comparison with ring listings within the database 108. For example, the ring selection system 110 may search a competitor's information hosted on a web page or otherwise publicly available in order to construct listings for comparison.

In some cases, the third-party system 106 may include a computing network associated with a social media network. The ring selection system 110 may obtain (e.g., access and/or store) social media data for use in determining predicted ring attributes. In various embodiments, the ring selection system 110 may analyze social media data (e.g., postings, images, hashtags) to determine predicted ring attributes and/or search parameters.

The client device(s) 102 may generally take any form of computing device, such as a personal mobile device, a personal computer, work station, terminal, mobile computer, mobile device, smartphone, tablet, a multimedia console, or the like. In general, the client application 104 is an instance of an application or software program executed on a client device 102. The client application 104 may be implemented via an application executing on the client device 102, a web browser, or other Internet- and/or network-enabled interface. The client devices 102 may also provide one or more digital images, which may be analyzed by the system, as described herein. For example, the client devices 102 may include a digital camera that is configured to create the digital images that may be analyzed by the ring selection system 110. The client devices 102 may also obtain digital images from external sources including third-party websites or content providers and provide those images to the ring selection system 110 for analysis and ring identification.

In some embodiments, the components of the ring selection system 110 are executed on one or more application servers, virtualized machines, or other network device(s) connected via the network 120. As described herein, portions of the ring identification service, model services, or other services may be implemented using one or more container environments, which may be instantiated or initiated, as required, to handle ring identification operations, described herein. Example container environments include Docker, Kubernetes engines, AWS Fargate, and other similar techniques for providing containerized computing processes. The ring identification service and other aspects of the ring selection system 110 may be implemented using dedicated servers or pooled computer resources or virtual machine environments provided by third parties. Portions of the ring selection system 110 may be executed on application server(s) and/or the client device(s) 102 (e.g., via the client application 104).

The network 120 may include local area networks and/or large area networks that are configured to relay data to the various devices of the system 100. The network may include, for example, the Internet, an intranet, an Ethernet network, a wired network, a wireless network, or the like. In some cases, a distributed network (e.g., a cloud computing system) hosts one or more components of the system 100.

Figure 1B:
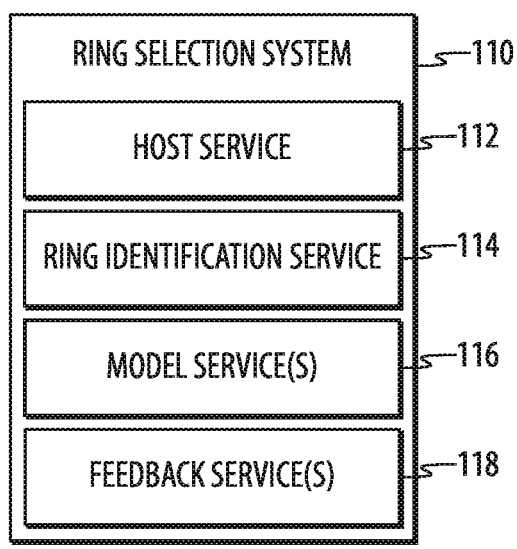
FIG. 1B depicts example services of the ring selection system for determining ring listings based on an image.

As noted above, the ring selection system 110 may determine a set of ring listings for presentation by identifying one or more ring listings for rings that match a ring in an image provided by a user. FIG. 1B depicts example services of the ring selection system 110 for determining ring listings based on an image. The services of the ring selection system 110 may include a host service 112, a ring identification service 114, one or more model services 116, and one or more feedback services 118.

Depicted in the schematic of FIG. 1B, the host service 112 may execute and/or provide communication with instances of the client application 104. The host service 112 may include and/or be implemented by one or more application servers, web servers, or the like. In some cases, some or all of the client application 104 is software executing on an application server or web server of the host service 112 that is accessible by the client device 102. Additionally or alternatively, some or all of the client application 104 may execute on a client device 102 that is connected to the ring selection system 110 via the network 120, and the host service 112 may facilitate communication between the ring selection system 110 and the client application 104.

In various embodiments, the host service 112 determines and/or provides sets of ring listings for presentation to users of the client application 104. The set of ring listings may be determined by identifying ring listings that match a ring in an image provided to the ring selection system. Additionally or alternatively, the set of ring listings may be determined based on search parameters, including desired stone characteristics and/or setting characteristics. Search parameters may be received from a user or determined by the ring selection system 110, for example based on outputs of a predictive model. In some cases, as described above, ring listings may be stored by the database(s) 108. In other cases, the ring selection system 110 may generate a ring listing from a stone listing and a setting listing stored in the databases 108.

The ring identification service 114 may analyze images to determine ring characteristics (e.g., stone and/or setting characteristics) of rings depicted in the images. The ring identification service 114 may include one or more graphics processing units (GPUs) for applying machine learning models to images to determine ring characteristics. The model service(s) 116 may maintain and deploy machine learning models to the ring identification service 114 for determining ring characteristics. In some cases, each model stored by the model service(s) is implemented as a separate container. The models stored by the model service(s) 116 may be accessible via an application programming interface (API) provided by the model service(s) 116. In various embodiments, the model service(s) may deploy multiple different models to the ring identification service 114 to analyze images to determine ring characteristics. Example models are discussed in more detail with respect to FIG. 2 below.

The feedback service(s) 118 may collect and aggregate data regarding the performance of the models used by the ring identification service 114 to identify ring characteristics from images. The feedback service(s) 118 may determine metrics to assess model performance, including F1-score of predictions, confidence values, and the like. The feedback service(s) 118 may provide the collected data and/or metrics to the model service(s) 116 for use in improving the models. In some cases, the feedback service(s) 118 collect data regarding user behavior after a set of ring listings has been provided to the user. For example, the feedback service(s) 118 may perform A/B testing or other evaluation techniques to determine which of two models is more likely to result in a purchase by a user. The feedback service(s) 118 may also be adapted to receive stone or ring data that corresponds to an image or other input as a training set or feedback data for the models provided by the model service(s) 116.

Each service of the ring selection system 110 can be implemented in a number of suitable ways. As illustrated, the host service 112, the ring identification service 114, the one or more model services 116, and the one or more feedback services 118 each includes one or more purpose-configured components, which may be either software or hardware. In particular, it may be appreciated that although these functional elements are identified as separate and distinct devices (e.g., servers) that can each include allocations of physical or virtual resources, such as one or more processors, memory, and/or communication modules (e.g., network connections and the like), that such an implementation is not required. More generally, it may be appreciated that the various functions described herein of each of the host service 112, the ring identification service 114, the one or more model services 116, and the one or more feedback services 118 can be performed by any suitable physical hardware, virtual machine, containerized machine, or any combination thereof. In various embodiments, operating the services separately may improve the scalability and/or efficiency of the ring selection system 110 as a whole.

Figure 1C:
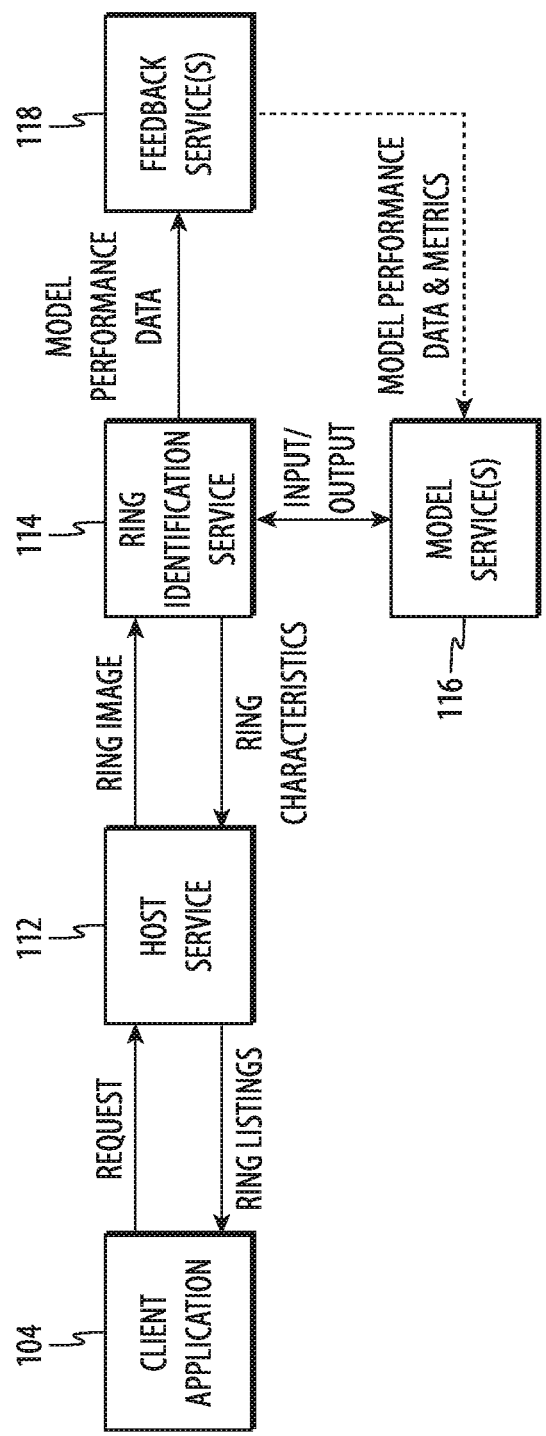
FIG. 1C depicts an example flow of data through the ring selection system during a ring identification process.

FIG. 1C depicts an example flow of data through the ring selection system 110 during a ring identification process. The client application 104 provides a request to the host service 112. The request may include an image or an image identifier (e.g., a URL, path, or other identifier that may be used to retrieve an image). In some implementations, the request includes the image itself. The request may further include search parameters, such as a desired price range and desired ring characteristics. As used herein, "search parameters" may refer to any search operator, query, string, character, or other function for use as an input in performing a search using the ring selection system. In some cases, search parameters specify desired stone characteristics and/or setting characteristics.

The host service 112 may provide the image to the ring identification service 114 for identification of one or more rings in the image. The model service(s) 116 may deploy one or more machine learning models to the ring identification service 114, and the ring identification service 114 may apply the model(s) to the image to determine ring characteristics. The ring identification service 114 may provide the determined ring characteristics to the host service 112, and the host service 112 may use the ring characteristics and/or the search parameters received as part of the request data to determine a set of ring listings. The host service 112 may provide the set of ring listings to the client application 104 for presentation to the user. The feedback service(s) 118 may receive model performance data from the ring identification service 114, and may provide aggregated model performance data and/or performance metrics to the model service(s) 116 for use in selecting or improving models.

In some cases, the model service(s) 116 may deploy multiple staged models. In one example, the model service(s) 116 deploys four models to the ring identification service 114 for identification of one or more rings in an image. The models may include a stone-locating machine learning model, a setting-locating machine learning model, a stone-classifying machine learning model, and a setting-classifying machine learning model. Application of the modules may be staged in which an output from one model serves as an input to another model. In some cases the use of the multiple staged models is referred to as a deep-learning machine learning model or other complex machine learning system that is able to handle unstructured data.

The stone-locating machine learning model may identify a stone portion of the image. The stone portion of the image may be a portion of the image depicting the stone of the ring depicted in the image. The stone-locating machine learning model receives an image as input and identifies the location of a stone in the image as output. The stone-locating machine learning model may define a bounding box that surrounds the stone portion of the image. The output of the stone-locating machine learning model may be coordinates of a bounding box defined around the stone portion of the image.

The stone-locating machine learning model may be a single-stage object detector that is trained using labeled images depicting stones. Example stone-locating machine learning models may utilize one or more image recognition algorithms, including R-CNN, YOLOv3, YOLO v4, SSD, RetinaNet, and the like. These image recognition algorithms may provide real-time or near real-time image analysis suitable for implementation as part of the ring selection system 110.

The stone-locating machine learning model may be composed of multiple architecture blocks. In one example, the stone-locating machine learning model includes a feature-extraction block (e.g., a backbone), a parameter-aggregation block (e.g., a neck), and an object-locating block (e.g., a head). The feature-extraction block may include a multi-layered convolutional neural network (CNN) with cross-stage-partial-connections to increase interconnectivity among layers and increase detection accuracy of objects of different sizes. An example feature-extraction block is CSP-DARKNET53.

The parameter-aggregation block may consist of additional CNN layers organized to aggregate data between layers to increase model accuracy. The parameter-aggregation block may employ one or more techniques for data aggregation, including spatial pyramid pooling (SPP), path aggregation networks (PAN), modified PAN, spatial attention modules (SAM), modified SAM, feature pyramid network (FPN), pyramidal feature hierarchy (PFH), and the like.

The object-locating block may locate and output bounding box coordinates within the image corresponding to the stone portion. Coordinates may include a pixel position (x,y) and/or a size (w,h) of the bounding box around the stone portion. The stone-locating machine learning model may be trained using a training data set consisting of labeled (e.g., manually labeled) bounding boxes surrounding stone portions of images.

The setting-locating machine learning model may identify a setting portion of the image. The setting portion of the image may be a portion of the image depicting the setting of the ring depicted in the image. The setting-locating machine learning model receives an image as input and identifies the location of a setting in the image as output. The output of the setting-locating machine learning model may be coordinates of a bounding box defined around the setting portion of the image. The setting-locating machine learning model may be similar to the stone-locating machine learning model, and may include a single-stage object detector that is trained using labeled images depicting settings. The setting-locating machine learning model may define a bounding box that surrounds the setting portion of the image. The output of the setting-locating machine learning model may be coordinates of a bounding box defined around the setting portion of the image.

In some cases, the setting-locating machine learning model determines the setting portion of the image based on the detected stone portion of the image. For example, the setting-locating machine learning model may identify the stone portion of the image and expand the bounding box associated with the stone portion to encompass the setting.

The stone-classifying machine learning model may determine a set of stone characteristics of the stone depicted in the stone portion of the image. The stone portion of the image (e.g., the contents of the bounding box identified by the stone-locating machine learning model) may be used as input to the stone-classifying machine learning model.

In some cases, the stone characteristics provided by the stone-classifying machine learning model include a stone shape that the stone most resembles. Example stone shapes may include emerald, cushion, oval, princess, and round. In some cases, the categories may include an "other" or "unknown" category that encompasses stones that are not classified into the remaining categories. The stone-classifying machine learning model may be trained using a training data set consisting of labeled images from each category of stone shapes.

The stone-classifying machine learning model may include a CNN that includes adjustable depth, width, and resolution. Depth, width, and resolution of the stone-classifying machine learning model may be selected during training by determining which combination provides the most accurate results. Examples of stone-classifying machine learning models include EfficientNet, ResNet, and the like.

The setting-classifying machine learning model may determine a set of setting characteristics of the setting depicted in the setting portion of the image. The setting portion of the image (e.g., the contents of the bounding box identified by the setting-locating machine learning model) may be used as input to the stone-classifying machine learning model.

In some cases, the setting characteristics provided by the setting-classifying machine learning model include a setting style that the setting most resembles. Example setting styles may include bezel set, halo, modern, pave, side stones, solitaire, three stone, two stone, vintage, and the like. In some cases, the categories may include an "other" or "unknown" category that encompasses settings that are not classified into the remaining categories.

The setting-classifying machine learning model may include a CNN model that includes residual blocks that allow shortcuts between layers of the CNN. An example CNN model is ResNet152.

The model service(s) 116 and/or the ring identification service 114 may train the setting-classifying machine learning model using a labeled training data set. In some cases, the model service 116 applies a raw (e.g., untrained) version of the setting-classifying machine learning model to each training image in the training data set, and obtains a feature vector of the setting-classifying machine learning model for each training image in the training data set. The feature vector may be obtained by determining an output of a next-to-last layer of the CNN model. The feature vectors may be grouped into a single matrix, and a clustering algorithm (e.g., a K-means clustering algorithm) may be applied to the matrix to determine a specified number of training clusters. In some cases, the specified number of training clusters may be determined empirically. In some cases, the specified number of training clusters is between 20 and 50 or between 30 and 40. In some cases, the training clusters determined by the clustering algorithm may be manually edited, for example to combine training clusters, to separate training clusters and the like. In some cases, once the training clusters have been edited, the model service 116 may enrich the setting-classifying machine learning model with an additional training data set to produce a trained version of the setting-classifying machine learning model.

Once the trained version of the setting-classifying machine learning model is produced, the trained version of the setting-classifying machine learning model is applied to a training data set, which may be the same training data set applied to the raw version. For each training image in the training data set, the model service 116 obtains a feature vector and groups the feature vectors into a single matrix. The clustering algorithm is applied to the matrix to determine a specified number of model clusters. The specified number of model clusters may be the same number as the specified number of training clusters. For each model cluster, a cluster centroid is computed. In some cases, each model cluster corresponds to a setting characteristic value, such as a value for a setting style. The model clusters may be named based on the setting styles represented by the cluster.

To use the setting-classifying machine learning model to determine a setting style of a setting portion of an image, the ring identification service 114 may apply the setting-classifying machine learning model to the setting portion of the image and obtain a feature vector corresponding to the image. The ring identification service 114 may determine a closest cluster centroid to the feature vector. Determining the closest cluster centroid to the feature vector may include comparing the feature vector to the cluster centroids of the model clusters and determining a cluster centroid having a smallest difference. The ring identification service 114 may subsequently determine the setting style (or other setting characteristic value) corresponding to the model cluster corresponding to the cluster centroid.

Figure 2:
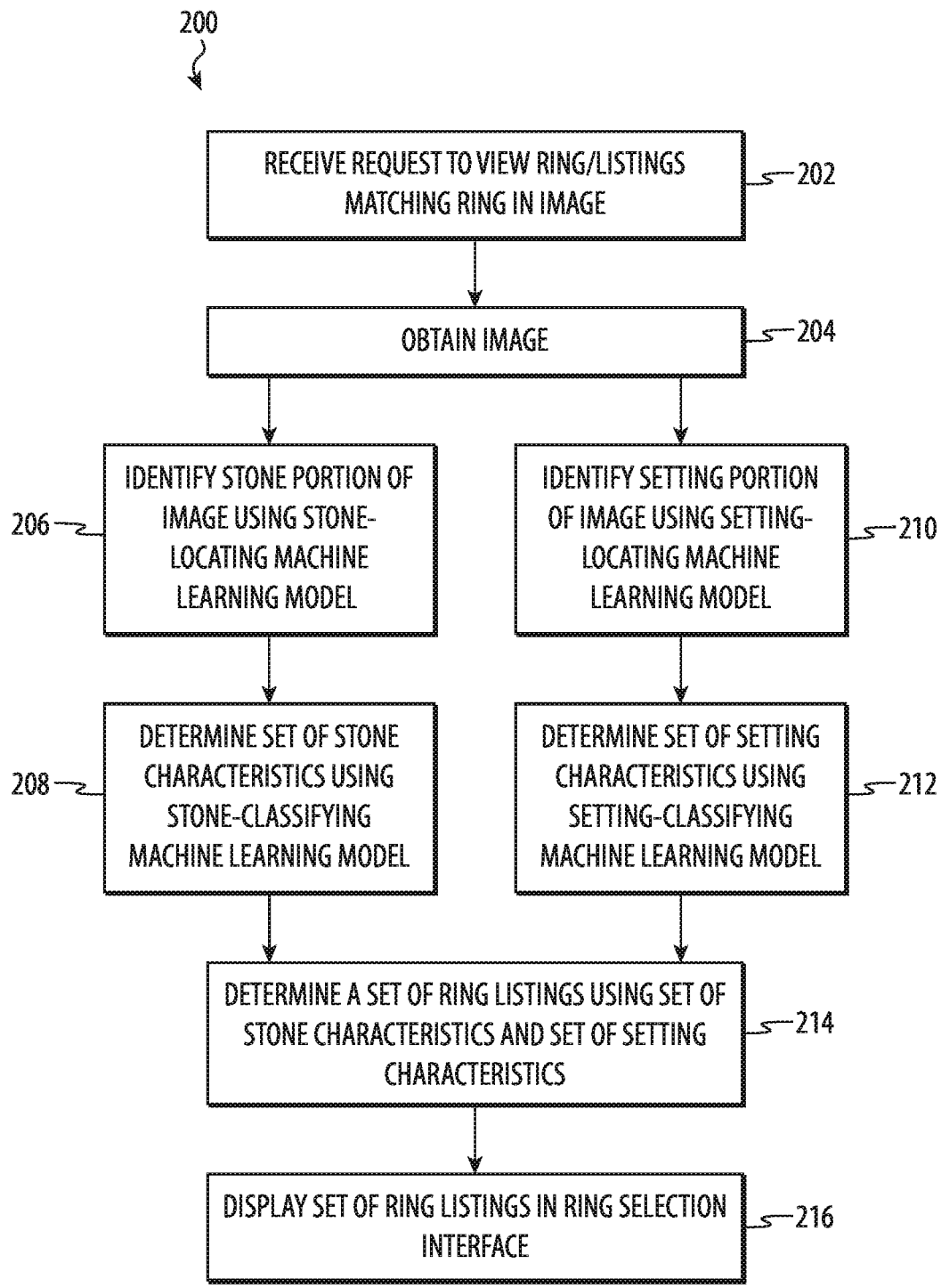
FIG. 2 is a flowchart of an example method for providing a set of ring listings based on determining ring characteristics of a ring in an image.

FIG. 2 is a flowchart of an example method 200 for providing a set of ring listings based on determining ring characteristics of a ring in an image. At operation 202, the ring selection system 110 receives a request to view ring listings that match a ring in an image. The request may be received via the ring selection interface of the client application 104, for example in response to a user providing an image or image identifier to the client application. At operation 204, the ring identification service 114 may obtain the image in response to receiving the request. If the image is provided as part of the request, the ring identification service may receive the image from the host service 112. In other cases, the host service 112 and/or the ring identification service 114 may access the image using an image identifier, such as a universal resource locator (URL) indicating a network-accessible storage location of the image.

Figure 3:
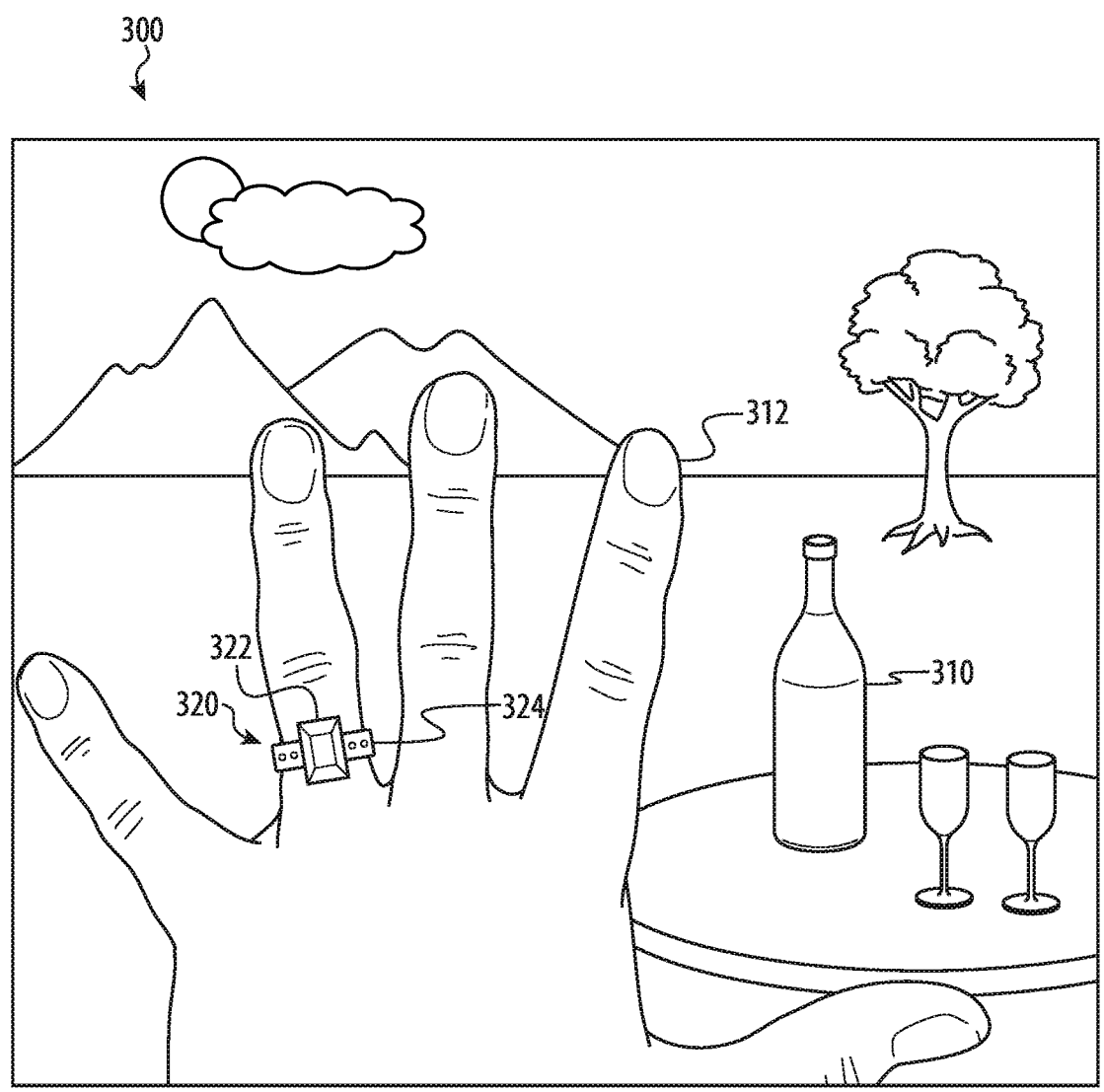
FIG. 3 depicts an example image depicting a ring.

FIG. 3 depicts an example image 300 that depicts a ring. The image includes a ring 320, which includes a stone 322 and a setting 324. As noted herein, stones may be any suitable synthetic or natural gemological stones, including diamonds, rubies, emeralds, and the like. Settings typically hold one or more stones and include a band for placing the ring around a wearer's finger. As noted herein, in various embodiments, images received by the ring selection system 110 may include images which may be broad composition images that include one or more objects and/or environmental features besides the ring. As shown in the example of FIG. 3, the ring 320 is on the hand 312 of a wearer, and several other objects 310 and/or features are depicted in the image 300. The techniques described herein may be particularly effective for identifying ring characteristics in an image that includes these and other non-jewelry objects as part of the image.

Figure 4A:
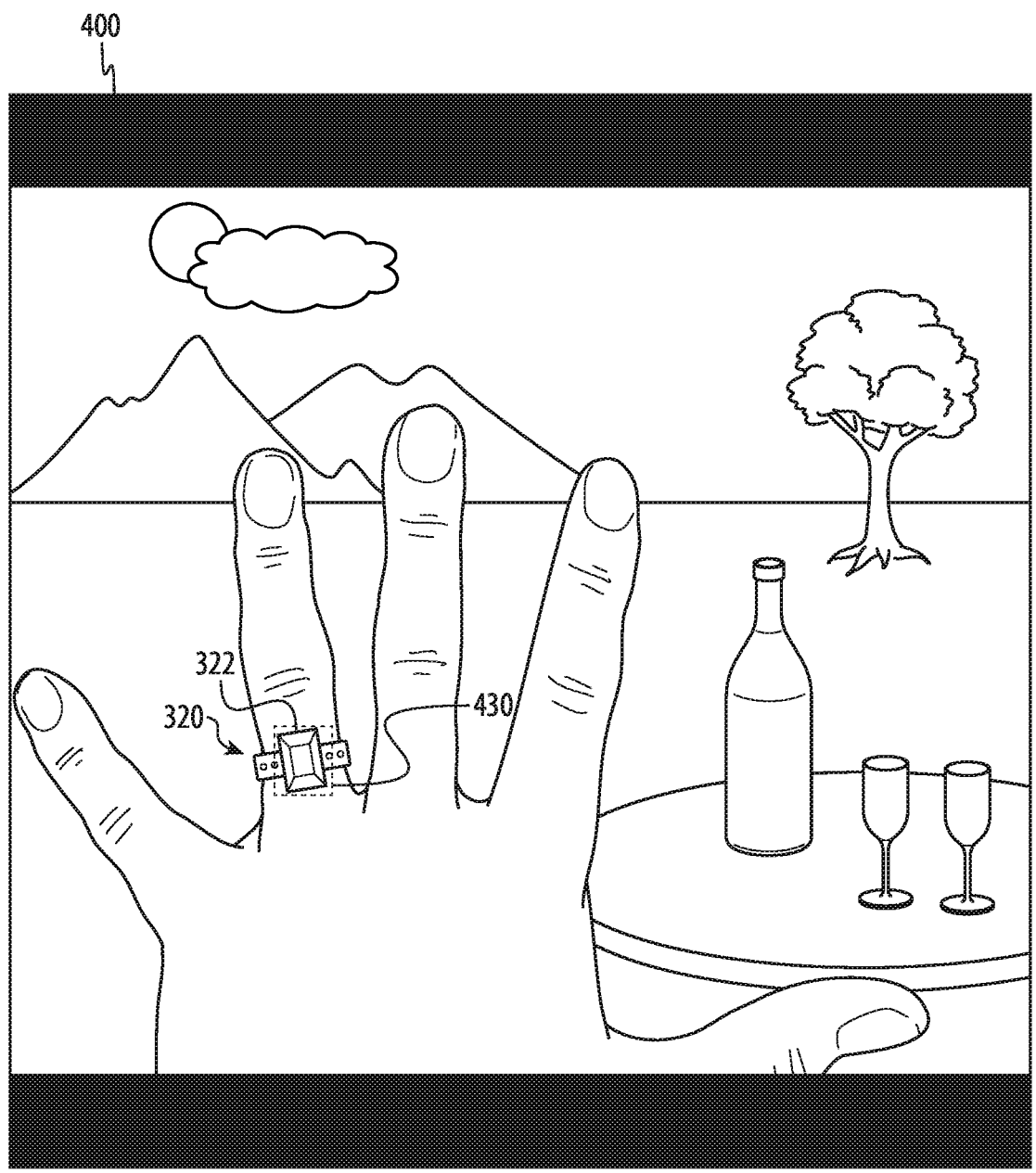
FIGS. 4A-4C depict example pre-processing operations performed on a stone portion of the image of FIG. 3.

In various embodiments, the ring identification service 114 may perform pre-processing operations to prepare the image 300 for input into one or more machine learning models. As one example, the ring identification service 114 may crop the image 300 to a specified aspect ratio or aspect ratio range that matches an aspect ratio or aspect ratio range for inputs to a machine learning model described below. FIG. 4A illustrates a cropped version 400 of the image 300 in which the aspect ratio of the image has been changed. In some cases, the image 300 is cropped to a square aspect ratio. In some cases, the ring identification service 114 uses a letterbox cropping technique, the result of which is shown in FIG. 4A, to crop the image to a specified aspect ratio without distorting and/or removing portions of the image.

As another example of pre-processing operations, the ring identification service 114 may scale the image 300 to a specified resolution or resolution range that matches a specified resolution or resolution range for inputs to a machine learning model described below. Scaling the image may include reducing the resolution of the image 300 (downsampling) or increasing the resolution of the image (upsampling). Similarly, if the image 300 is below a threshold pixel resolution, the ring identification service 114 may upsample the resolution to a specified pixel resolution (or resolution range). In one example, if the resolution of the image 300 is below 128 pixels by 128 pixels or above 800 pixels by 800 pixels, the ring identification service 114 may upsample or downsample the resolution to between 500 pixels by 500 pixels and 700 pixels by 700 pixels. In some cases, the image 300 is not pre-processed and the method 200 proceeds with the original image 300.

Returning to FIG. 2, at operation 206, the ring identification service 114 may identify a stone portion of the image using a stone-locating machine learning model. For example, as shown in FIG. 4A, the ring identification service 114 may identify a stone portion 430 of the pre-processed image 400. As noted above, the stone portion 430 of the image 400 may be a portion of the image depicting the stone 322 of the ring 320 depicted in the image. The stone-locating machine learning model may define a bounding box that surrounds the stone portion of the image. The output of the stone-locating machine learning model may be coordinates of the bounding box.

As noted above, the stone-locating machine learning model receives an image (e.g., image 400) as input and identifies the location of a stone in the image as output. As shown in FIG. 4A, the output of the stone-locating machine learning model may be coordinates of the bounding box defined around the stone portion 430 of the image 400.

At operation 208, the ring identification service 114 may determine a set of stone characteristics by applying a stone-classifying machine learning model to the stone portion of the image. The stone portion 430 (e.g., the contents of the bounding box identified by the stone-locating machine learning model) may be used as input to the stone-classifying machine learning model.

In some cases, the stone characteristics provided by the stone-classifying machine learning model include a stone shape that the stone most resembles. Example stone shapes may include emerald, cushion, oval, princess, and round. In some cases, the categories may include an "other" or "unknown" category that encompasses stones that are not classified into the remaining categories. The stone-classifying machine learning model may be trained using a training data set consisting of labeled images from each category of stone shapes.

In some cases, the ring identification service 114 may determine a confidence value corresponding to a predicted stone characteristic (e.g., a stone shape) determined by the stone-classifying machine learning model. The ring identification service 114 may determine whether the confidence value meets or exceeds a predetermined confidence value threshold (e.g., 95% confidence, 90% confidence, 80% confidence, 70% confidence, or the like). In response to the confidence value meeting or exceeding the confidence value threshold, the ring identification service 114 may determine the predicted stone characteristic is a stone characteristic of the stone. In response to the confidence value being below the confidence value threshold, the ring identification service 114 may classify the stone characteristic as unknown or determine whether other values for the stone characteristic have confidence values that exceed the threshold.

Figure 4B:
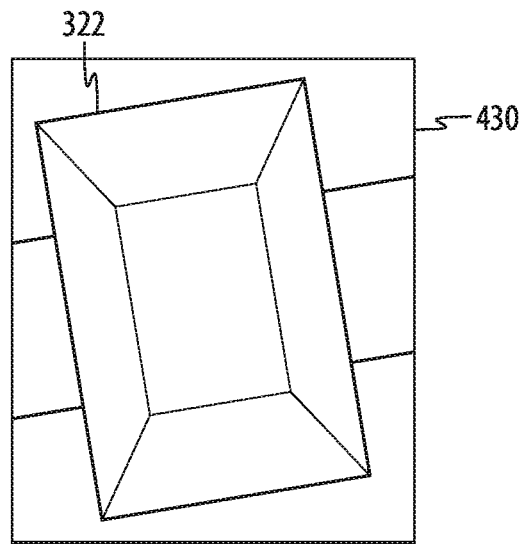
Figure 4C:
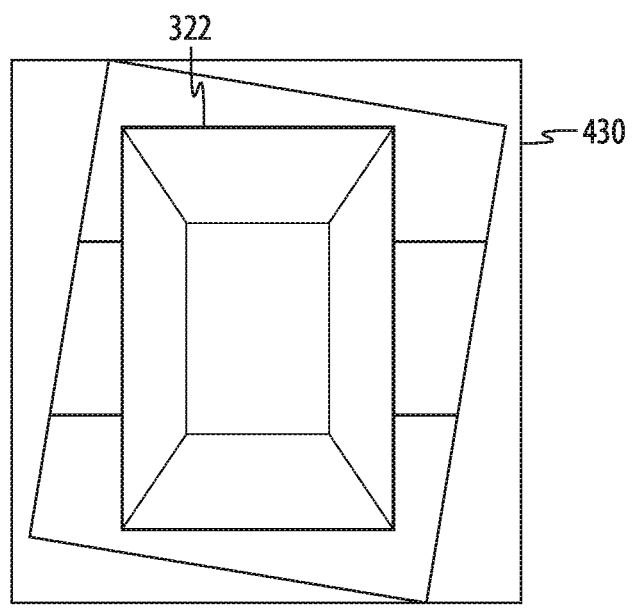

In some cases, the stone portion 430 may be pre-processed according to input requirements of the stone-classifying machine learning model. Pre-processing techniques may include scaling, cropping, rotating, and the like. FIGS. 4B-4C depict example pre-processing operations performed on the stone portion 430 of the image 400. FIG. 4B depicts the stone portion 430 prior to pre-processing operations. In FIG. 4C, the stone portion 430 has been rotated and cropped. As shown in the example of FIG. 4C, the ring identification service 114 may rotate the stone portion 430 to straighten the stone, which may increase the accuracy of the stone-classifying machine learning model. Similarly, the ring identification service 114 may crop the stone portion 430 to change an aspect ratio of the stone portion to match an input aspect ratio (e.g., square) or aspect ratio range of the stone-classifying machine learning model. In one example, the stone portion 430 is rotated, cropped, and scaled to achieve a resolution between 100 pixels by 100 pixels and 200 pixels by 200 pixels.

Figure 5A:
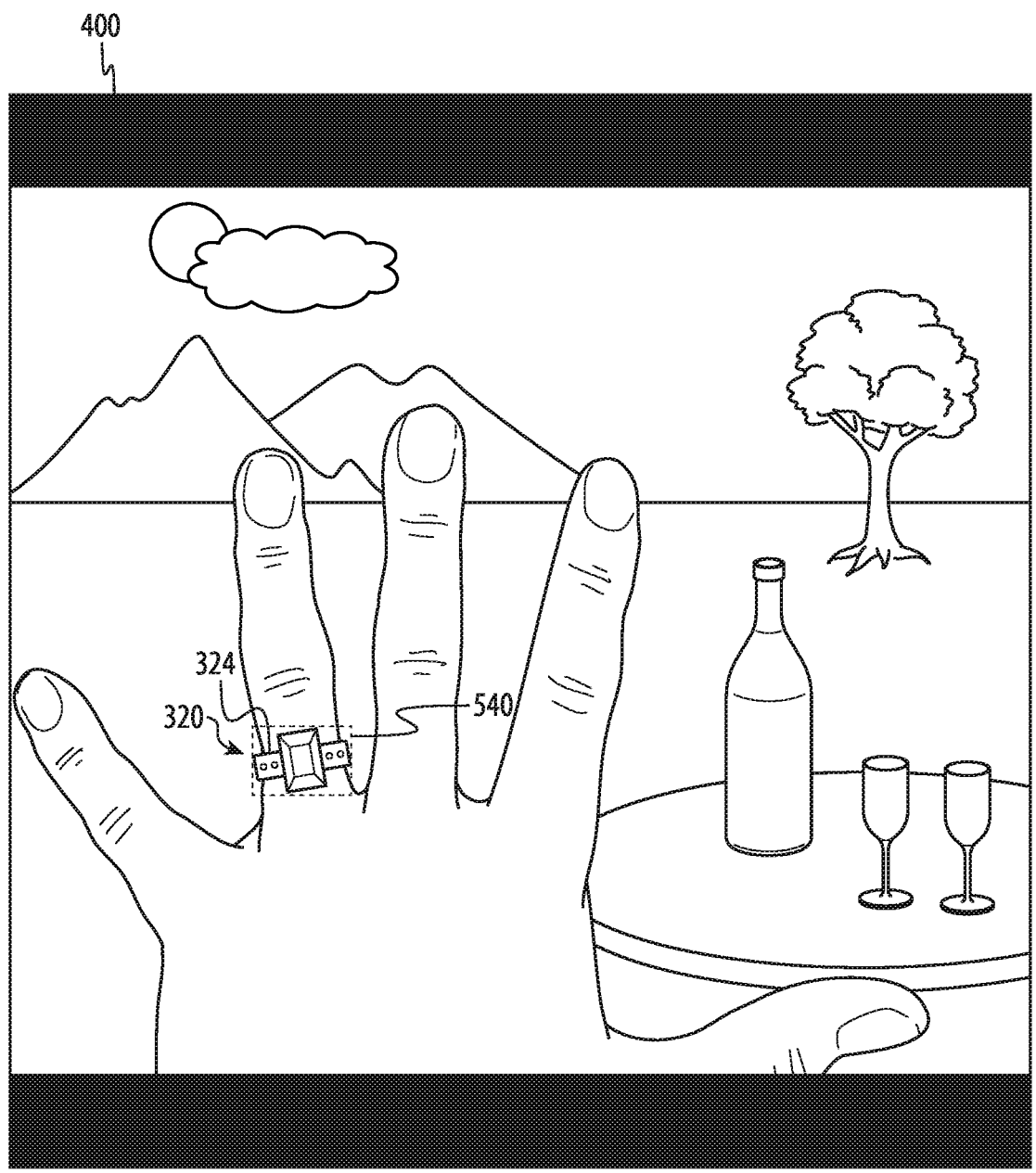
FIGS. 5A-5C depict example pre-processing operations performed on a setting portion of the image of FIG. 3.

At operation 210, the ring identification service 114 may identify a setting portion of the image using a setting-locating machine learning model. For example, as shown in FIG. 5A, the ring identification service 114 may identify a setting portion 540 of the pre-processed image 400. As noted above, the setting portion 540 of the image 400 may be a portion of the image depicting the setting 324 of the ring 320 depicted in the image.

The setting-locating machine learning model receives an image (e.g., image 400) as input and identifies the location of a setting in the image as output. As shown in FIG. 5A, the output of the setting-locating machine learning model may be coordinates of a bounding box defined around the setting portion 540 of the image 400. The setting-locating machine learning model may be similar to the stone-locating machine learning model, and may include a single-stage object detector that is trained using labeled images depicting settings. The setting-locating machine learning model may define a bounding box that surrounds the setting portion of the image. The output of the setting-locating machine learning model may be coordinates of the bounding box.

In some cases, the setting-locating machine learning model determines the setting portion of the image based on the detected stone portion of the image. For example, the setting-locating machine learning model may identify the stone portion of the image and expand the bounding box associated with the stone portion to encompass the setting.

At operation 212, the ring identification service 114 may determine a set of setting characteristics by applying a setting-classifying machine learning model to the setting portion of the image. The setting portion 540 (e.g., the contents of the bounding box identified by the setting-locating machine learning model) may be used as input to the setting-classifying machine learning model.

In some cases, the setting characteristics provided by the setting-classifying machine learning model include a setting style that the setting most resembles. Example setting styles may include bezel set, halo, modern, pave, side stones, solitaire, three stone, two stone, vintage, and the like. In some cases, the categories may include an "other" or "unknown" category that encompasses settings that are not classified into the remaining categories.

The ring identification service 114 may apply the setting-classifying machine learning model to the setting portion of the image and obtain a feature vector. The ring identification service 114 may determine a closest cluster centroid to the feature vector. The ring identification service 114 may subsequently determine the setting style corresponding to the model cluster corresponding to the cluster centroid.

In some cases, the ring identification service 114 may determine a confidence value corresponding to a predicted setting characteristic (e.g., a setting style) determined by the setting-classifying machine learning model. The ring identification service 114 may determine whether the confidence value meets or exceeds a predetermined confidence value threshold (e.g., 95% confidence, 90% confidence, 80% confidence, 70% confidence, or the like). In response to the confidence value meeting or exceeding the confidence value threshold, the ring identification service 114 may determine the predicted setting characteristic is a setting characteristic of the setting. In response to the confidence value being below the confidence value threshold, the ring identification service 114 may classify the setting characteristic as unknown or determine whether other values for the setting characteristic have confidence values that exceed the threshold.

Figure 5B:
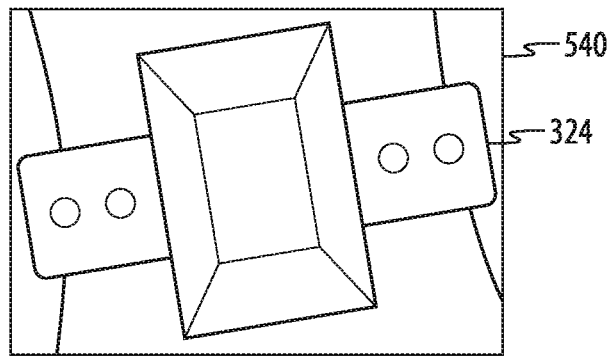
Figure 5C:
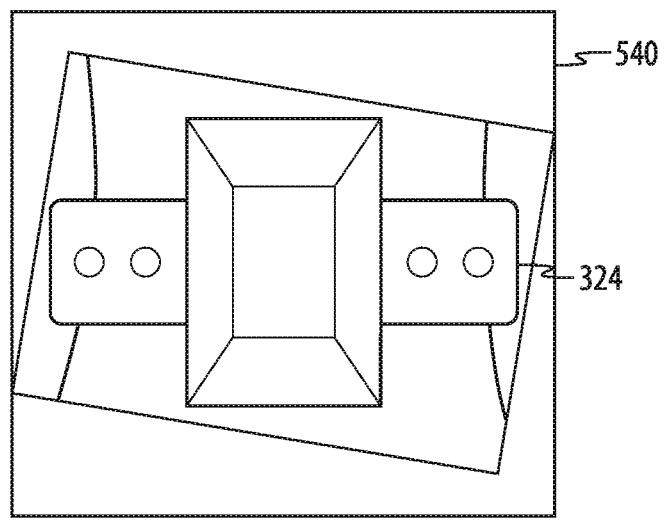

In some cases, the setting portion 540 may be pre-processed according to input requirements of the setting-classifying machine learning model. Pre-processing techniques may include scaling, cropping, rotating, and the like. FIGS. 5B-5C depict example pre-processing operations performed on the setting portion 540 of the image 400. FIG. 5B depicts setting portion 540 prior to pre-processing operations. In FIG. 5C, the setting portion 540 has been rotated and cropped. As shown in the example of FIG. 5C, the ring identification service 114 may rotate the setting portion 540 to straighten the setting, which may increase the accuracy of the setting-classifying machine learning model. Similarly, the ring identification service 114 may crop the setting portion 540 to change an aspect ratio of the setting portion to match an input aspect ratio or aspect ratio range of the setting-classifying machine learning model. In one example, the setting portion 540 is rotated, cropped, and scaled to achieve a resolution between 100 pixels by 100 pixels and 200 pixels by 200 pixels.

As represented by the two branches present in FIG. 2, in various embodiments, the operations 206 and 208 may be performed in parallel and/or separately from the operations 210 and 212. For example, a runtime of the stone-locating machine learning model may overlap with a runtime of the setting-locating machine learning model and/or a runtime of the setting-classifying machine learning model. Similarly, a runtime of the stone-classifying machine learning model may overlap with a runtime of the setting-locating machine learning model and/or a runtime of the setting-classifying machine learning model.

Figure 6A:
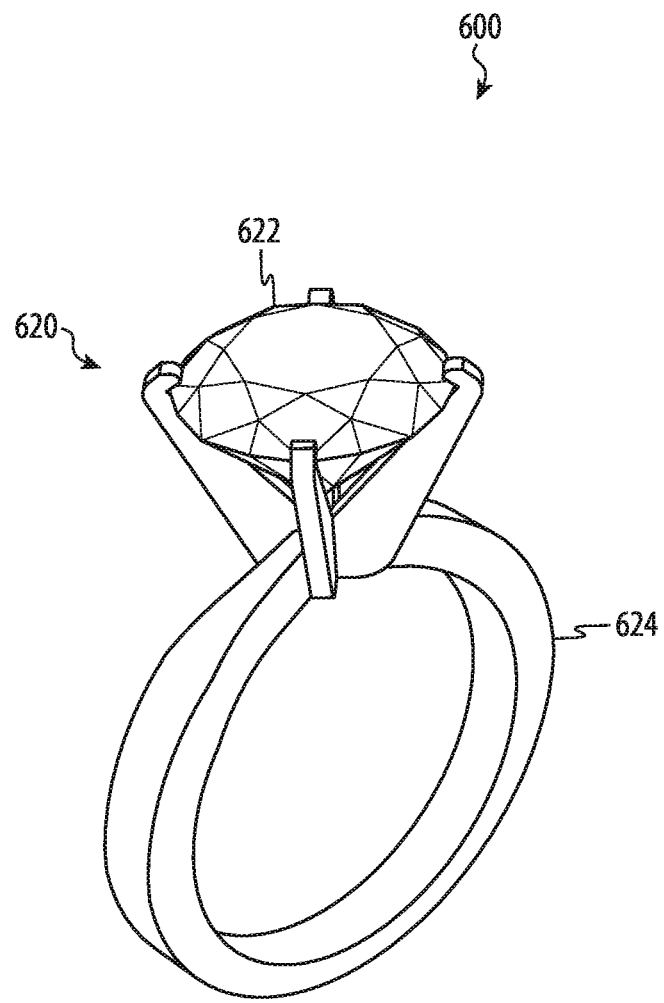
FIGS. 6A-6C depict another example image depicting a ring.
Figure 6B:
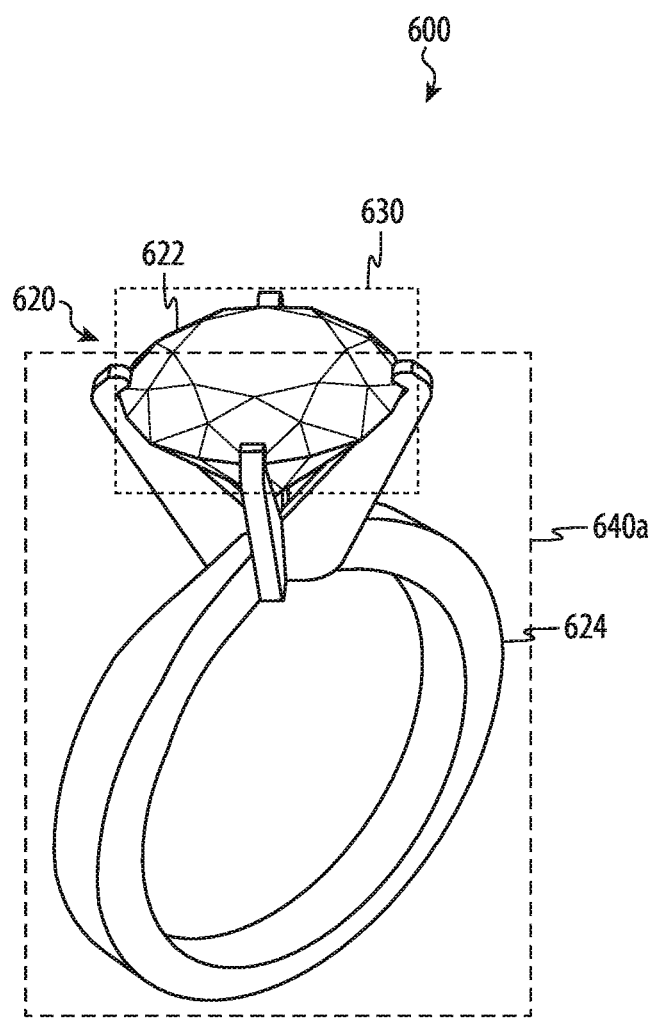
Figure 6C:
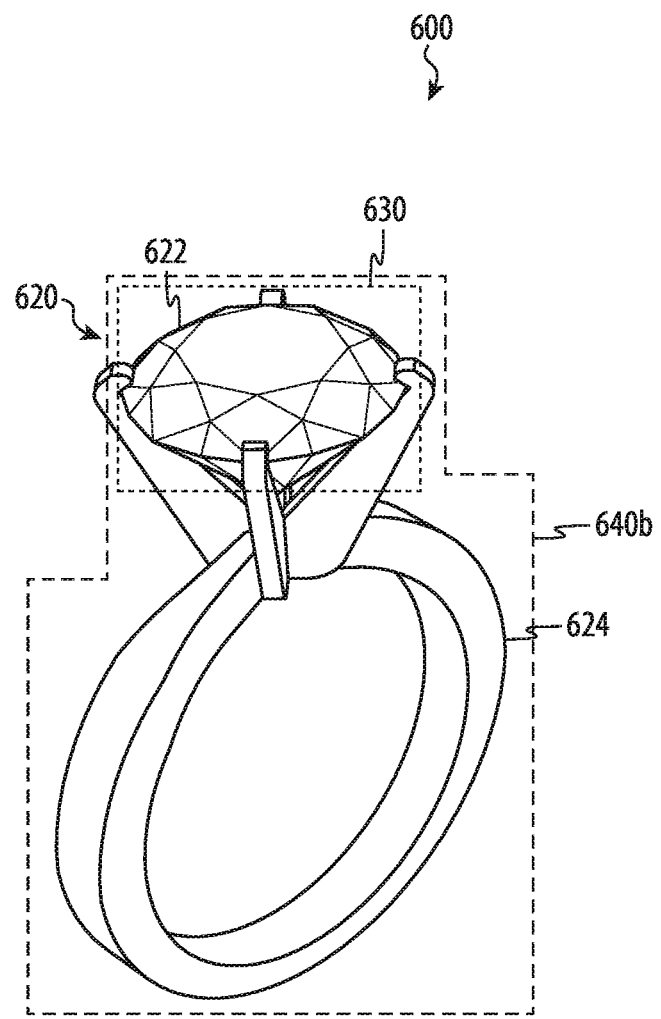

FIGS. 6A-6C depict another example image 600 depicting a ring 620 having a stone 622 and a setting 624. FIG. 6A shows an example of an image in which the components of a composite object (e.g., the ring 620) overlap and an example of one of the multiple different angles from which a composite object may be photographed. The complex geometry and wide variety of different angles of rings in images make identification of stones and settings difficult. As shown in FIG. 6B, the bounding box 630 surrounding the identified stone portion of the image 600 may overlap with the bounding box 640*a* surrounding the identified setting portion of the image. The bounding boxes 630, 640*a* shown in FIG. 6B are rectangular in shape. In various embodiments, the bounding boxes may have different shapes that correspond to the shapes of the stone and/or setting. For example, as shown in FIG. 6C, the setting bounding box 640*b* is a complex shape that extends around the setting portion of the image 600.

At operation 214, the host service 112 may determine a set of ring listings using the set of stone characteristics and the set of setting characteristics. The host service 112 may determine the set of ring listings by searching the database(s) 108 for rings, stones, and/or settings matching the determined stone characteristics and setting characteristics. The host service 112 may determine search parameters for a search of the database(s) based on the determined stone characteristics and/or setting characteristics. In some cases, additional or alternative search parameters may be received from users, for example with the request. As an example, a user may specify a price range that is incorporated into the search parameters. As another example, a user may specify certain stone and/or setting characteristics that are incorporated into the search parameters.

After determining search parameters, the host service 112 may perform a search of the database(s) 108. The host service 112 may search for ring listings which match all the search parameters, ring listings which match some of the search parameters, and/or ring listings with values within a range of the search parameters. As one example, if the determined stone characteristics are a stone shape and the determined ring characteristics are a setting style, the search results may be ring listings having the stone shape and the setting style. The host service 112 may provide all search results as the set of ring listings, or it may further refine the search results to determine the set of ring listings.

The host service 112 may generate and/or retrieve images, graphics, and other data relating to the ring listings. In some cases, the host service 112 may generate a composite image of a stone and a setting from an image of the stone and an image of the setting. This may be useful for showing users what a combination of a stone with a particular setting would look like, even if a photograph of that particular combination is unavailable.

In some cases, the ring selection system 110 may only determine setting characteristics or ring characteristics for a particular image. In some cases, for example, the ring selection system 110 may be unable to determine setting characteristics or ring characteristics. In such a case, the ring selection system 110 may determine the set of ring listings based on the determined setting characteristics or ring characteristics. As an example, in some cases, the ring selection system 110 may determine a setting style for a ring in an image, but be unable to determine a stone shape. The ring selection system 110 may determine the set of ring listings based on the setting style. Similarly, in some cases, the ring selection system 110 may determine a stone shape, but be unable to determine a setting style. The ring selection system 110 may determine the set of ring listings based on the stone shape.

At operation 216, the client application 104 may display the set of ring listings in a ring selection interface. The host service 112 may make the set of ring listings available to the client application 104, and the client application 104 may display the set of ring listings in a ring selection interface.

In some cases, the host service 112 determines a subset of the set of ring listings for presentation at the client application 104. Additionally or alternatively, the host service 112 may determine a presentation order of the set or subset of ring listings. The subset may be determined by determining which ring listings of the set of ring listings most closely match the search parameters and/or the predicted ring characteristics determined by the ring identification service 114. As discussed in more detail below, in some cases, the subset and/or the presentation order may be updated based on feedback received from users regarding the ring listings.

Figure 7A:
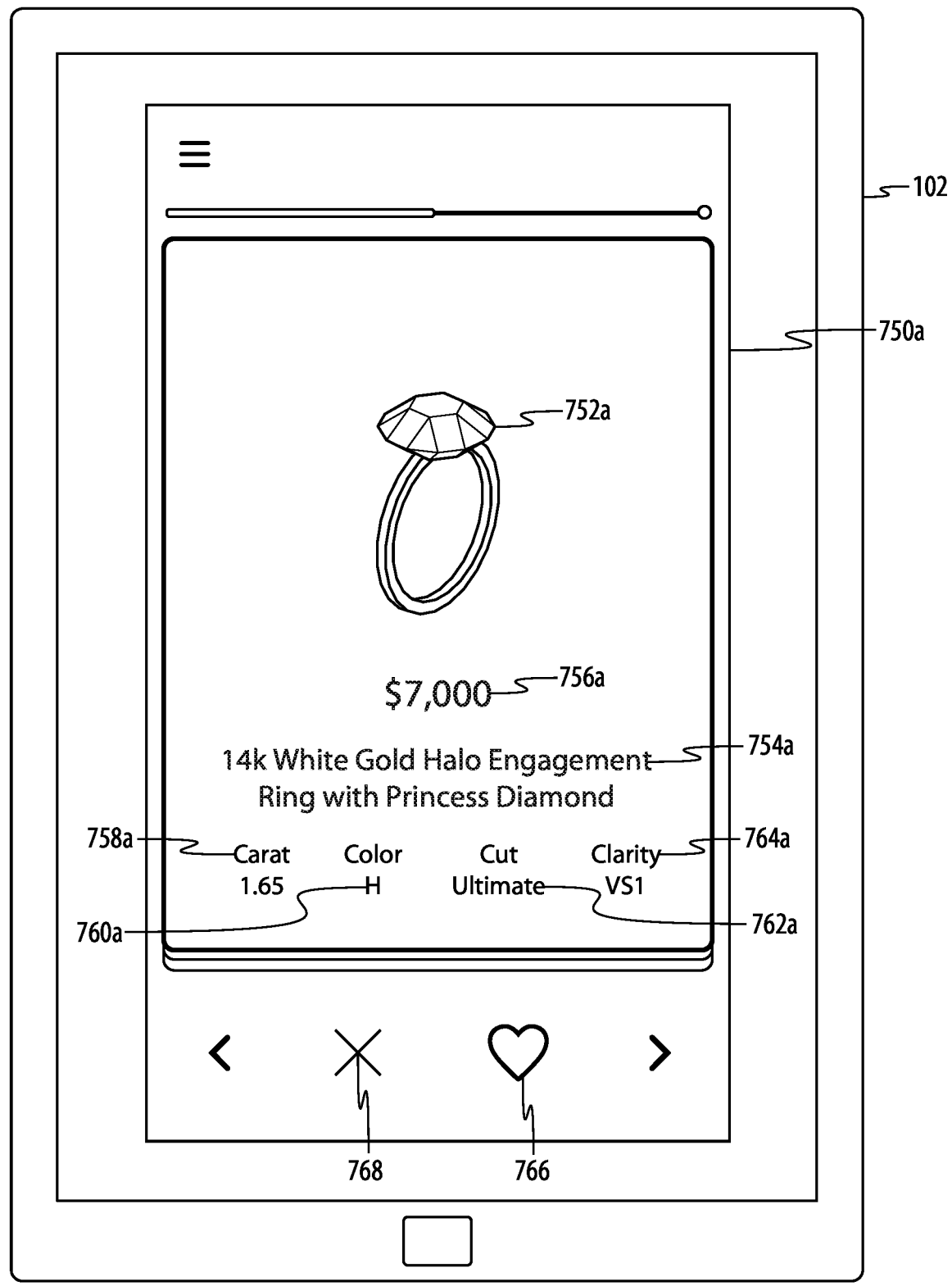
FIGS. 7A-7C depict example ring listings displayed by the client application.

FIG. 7A depicts a ring listing 750a displayed by the client application 104 on a display of a client device 102. As noted herein, the client application 104 may present a user interface on the client device 102 through which users may access the ring selection system 110. The ring listing 750a may be part of a set of ring listings displayed by the client application 104 in response to a request to view ring listings matching a ring depicted in an image. Specifically, the ring listings may correspond to a set of search results that were seeded or generated using the features extracted from one or more ring identification operations, described herein.

The ring listing 750a may correspond to an associated ring from the database 108 (or a combination of separate stone(s) and a setting from the database 108). The ring listing 750a may include ring characteristics of the associated ring, including an image 752a, a ring name 754a including a stone shape and setting style, a ring price 756a, a stone weight 758a, a stone color 760a, a stone cut 762a, and a clarity rating 764a. As shown in the example graphical user interface, the ring listing 750a may occupy a substantial entirety of the display of the client device, which allows the user to more easily view the visual characteristics of the jewelry along with a summary of select characteristics. The ring listing 750a may also be referred to as a card or tile, which may be manipulated by the user via a touch interface, as described herein.

The ring listing 750a may further include elements for users to provide user inputs regarding the ring listing. For example, the user interface may include preference indicators 766 and 768 for the user to indicate a preference regarding the ring listing 750a (e.g., that the user likes or does not like the ring associated with the ring listing 750a).

For example, a user may select or otherwise interact with the "favorite" preference indicator 766 to indicate that the user likes the ring associated with the ring listing 750a (e.g., a positive preference). Similarly, a user may select or otherwise interact with the "discard" preference indicator 768 to indicate that the user does not like the ring associated with the ring listing 750a (e.g., a negative preference).

In some embodiments, users may indicate a preference regarding the ring listing 750a using gestures, such as taps, swipes, or other interactions. For example, the client device 102 may include a touch-sensitive display, and a user may swipe or drag the ring listing 750a using the touch-sensitive display of the client device 102 to indicate a preference regarding the ring listing 750a. The direction of the swipe that corresponds to each preference may correspond to the preference indicators 766, 768. For example, swipe to the left may indicate that a user does not like the ring, and a swipe to the right may indicate that the user does like the ring. Alternatively or additionally, different swipe directions and/or gestures may be used to indicate preferences. The swipe or other gesture input may result in the ring listing, card, or tile being moved across the display, thereby simulating the movement of a physical object being manipulated by the user's touch.

Figure 7B:
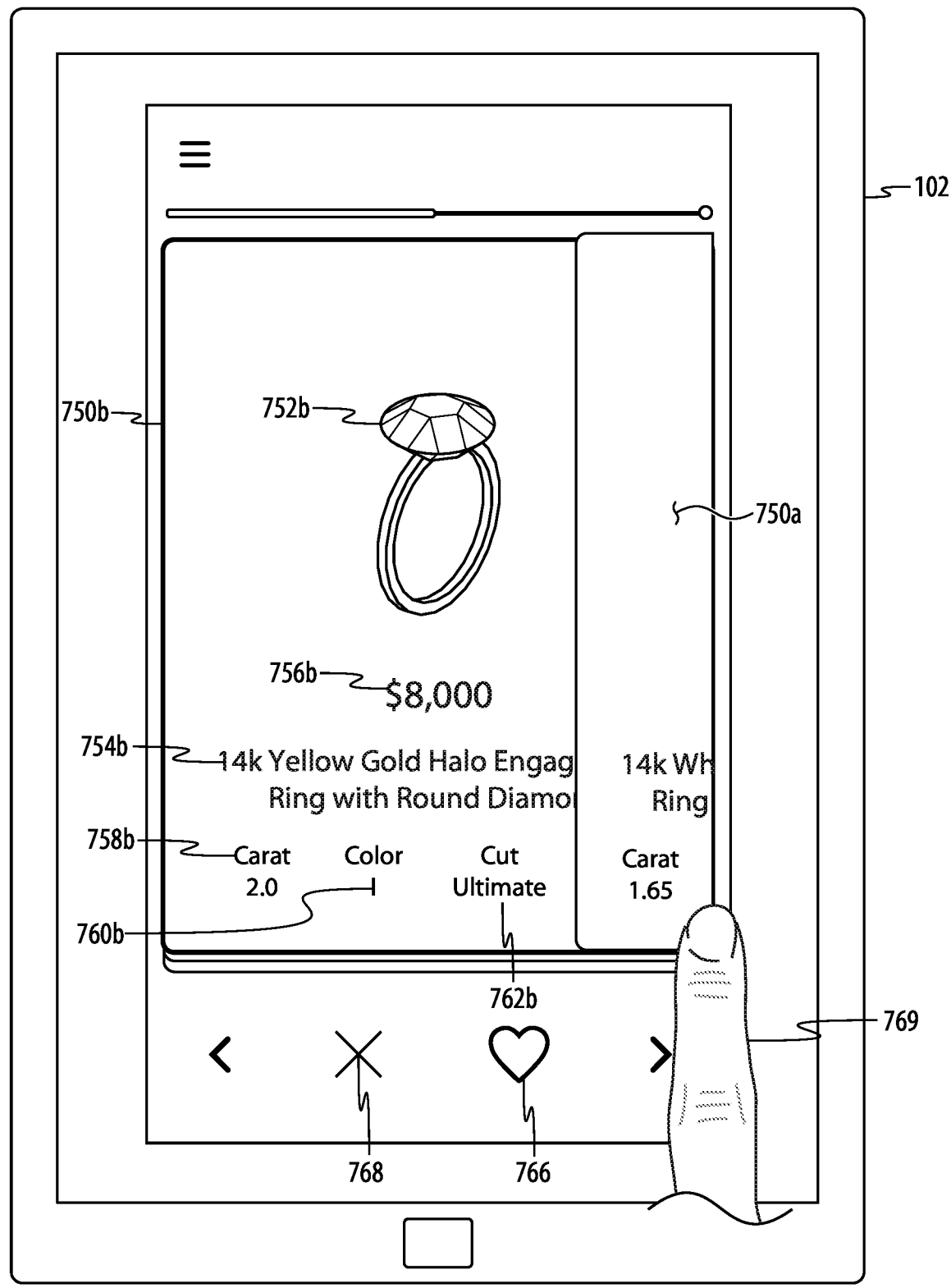
Figure 7C:
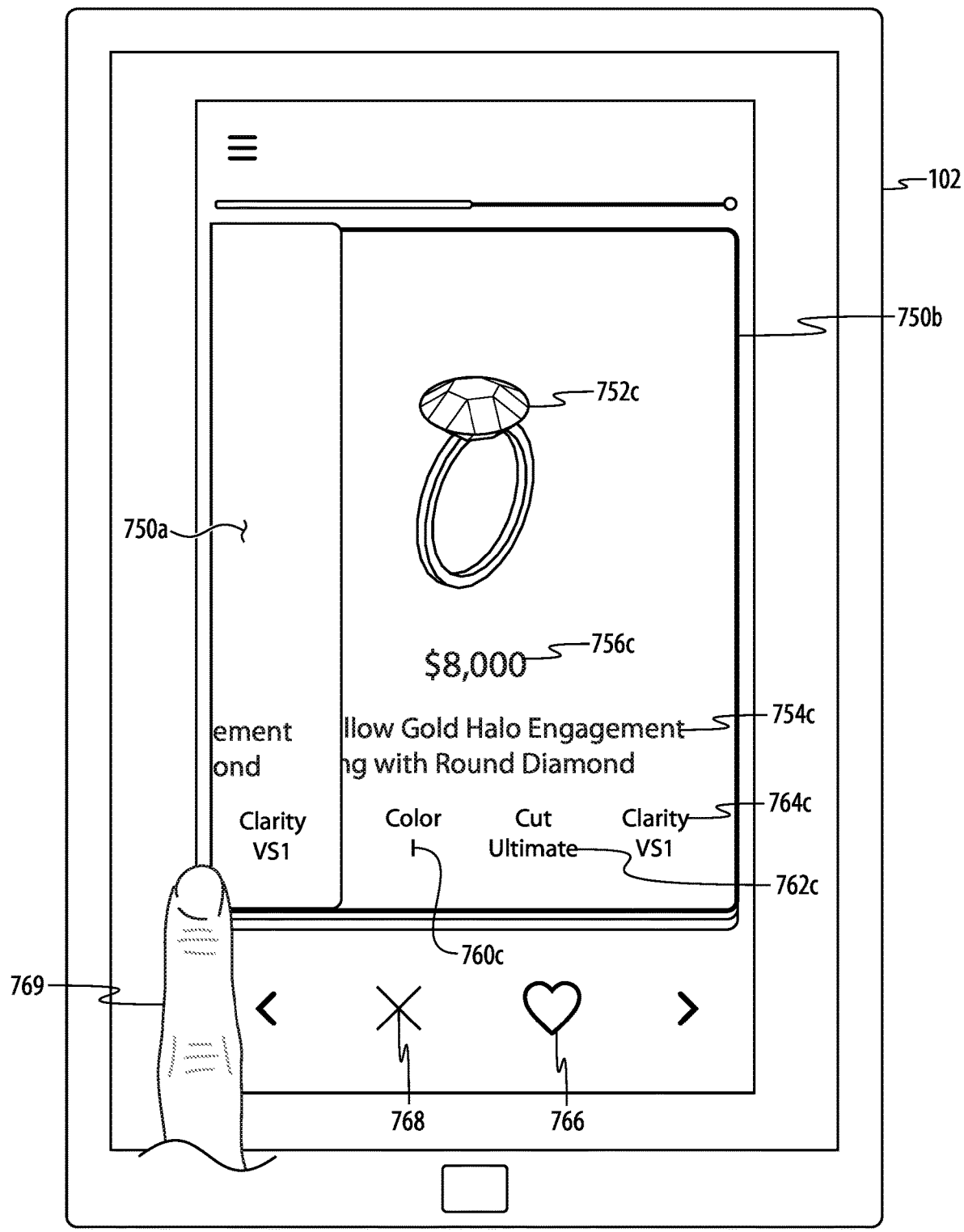

In some embodiments, in response to a user indicating a preference, the ring listing 750a is no longer displayed and a new ring listing from the set of ring listings is displayed in the user interface. FIGS. 7B and 7C depict transitions from the ring listing 750a to another ring listing 750b. In the embodiments of FIGS. 7B and 7C, the ring listing 750a transitions off of the display (e.g., slides according to a swipe or in the direction of an indicator). For example, in FIG. 7B, a finger 769 swipes to the right while the ring listing 750a is displayed, and the ring listing 750a appears to slide off the display to the right, revealing the new ring listing 750b. In some embodiments, the new ring listing 750b is the next ring listing in a set of ring listings determined by the ring selection system. Similarly, in FIG. 7C, a finger 769 swipes to the left while the ring listing 750a is displayed, and the ring listing 750a appears to slide off the display to the left, revealing a new ring listing 750b.

In some cases, the ring selection system may determine an updated subset of ring listings and/or an updated presentation order of the ring listings based on receiving the user preferences regarding the ring listings. For example, the updated ring listings and/or presentation order may be performed automatically and in response to a criteria being satisfied after monitoring user input for a previously presented set of listings. In some cases, the ring selection system may update the search parameters used to obtain the set of ring listings in order to obtain a new set of ring listings. In some embodiments, the ring selection system receives a series of preferences that correspond to multiple ring listings. For example, the ring selection system may receive a series of preferences by a user swiping or otherwise interacting with multiple sequentially or simultaneously presented ring listings. In some embodiments, the ring selection system determines whether the series of preferences indicates that the search parameters, the subset of ring listings, and/or the presentation order should be modified or updated in response to a number of positive indications satisfying one or more criterium. Similarly, negative indications can be tracked and the system may automatically obtain new listings or determine a new listing order in accordance with one or more criterium.

As noted above, in some cases, the ring selection system may automatically update the search parameters used to obtain the set of ring listings in order to obtain a new set of ring listings. By way of example, the ring selection system determines one or more modification metrics that correspond to one or more search parameters. In various embodiments, the modification metrics indicate whether one or more search parameters, the subset of ring listings, and/or the presentation order should be updated. For example, the ring selection system may determine whether a modification metric meets or exceeds a predetermined threshold, and in response to a modification metric meeting or exceeding the threshold, the ring selection system may modify or update search parameters, the subset of ring listings, and/or the presentation order. Similarly, for example, the ring selection system may determine whether a modification metric meets or is lower than a predetermined threshold, and in response to a modification metric meeting or being lower than the threshold, the ring selection system may modify or update search parameters, the subset of ring listings, and/or the presentation order.

As an example, a modification metric may correspond to an ultimate diamond cut and have an example threshold of 9. In response to the user indicating a negative preference for a ring listing with an ultimate diamond cut, the modification metric may be increased from zero to five. In response to the user indicating a negative preference for an additional listing with an ultimate diamond cut, the modification metric may be increased from five to ten. In response to the modification metric exceeding the threshold of 9, the ring selection system may modify or update search parameters, the subset of ring listings, and/or the presentation order. For example, the ring selection system may modify the search parameters to exclude listings with ultimate cut diamonds and perform a new search for ring listings.

The above example is illustrative and not meant to be limiting. In various embodiments, the modification metric may be a weighted average or other similar technique. For example, each positive (or negative) vote may have a pre-assigned value, which may increase (or decrease) a weighted average over time. Alternatively, the positive (or negative) voting may increment (or decrement) the running average or metric.

In various embodiments, the preference indicators 766, 768 provide visual feedback as a user indicates a preference. For example, as shown in FIG. 7B, the "favorite" preference indicator 766 may change size, color, pattern, and/or some other characteristic to indicate that a user has selected the "favorite" preference indicator or made a gesture that corresponds to the "favorite" preference indicator. Similarly, as shown in FIG. 7C, the "discard" preference indicator 768 may change size, color, pattern, and/or some other characteristic to indicate that a user has selected the "discard" preference indicator or made a gesture that corresponds to the "discard" preference indicator.

Figure 7D:
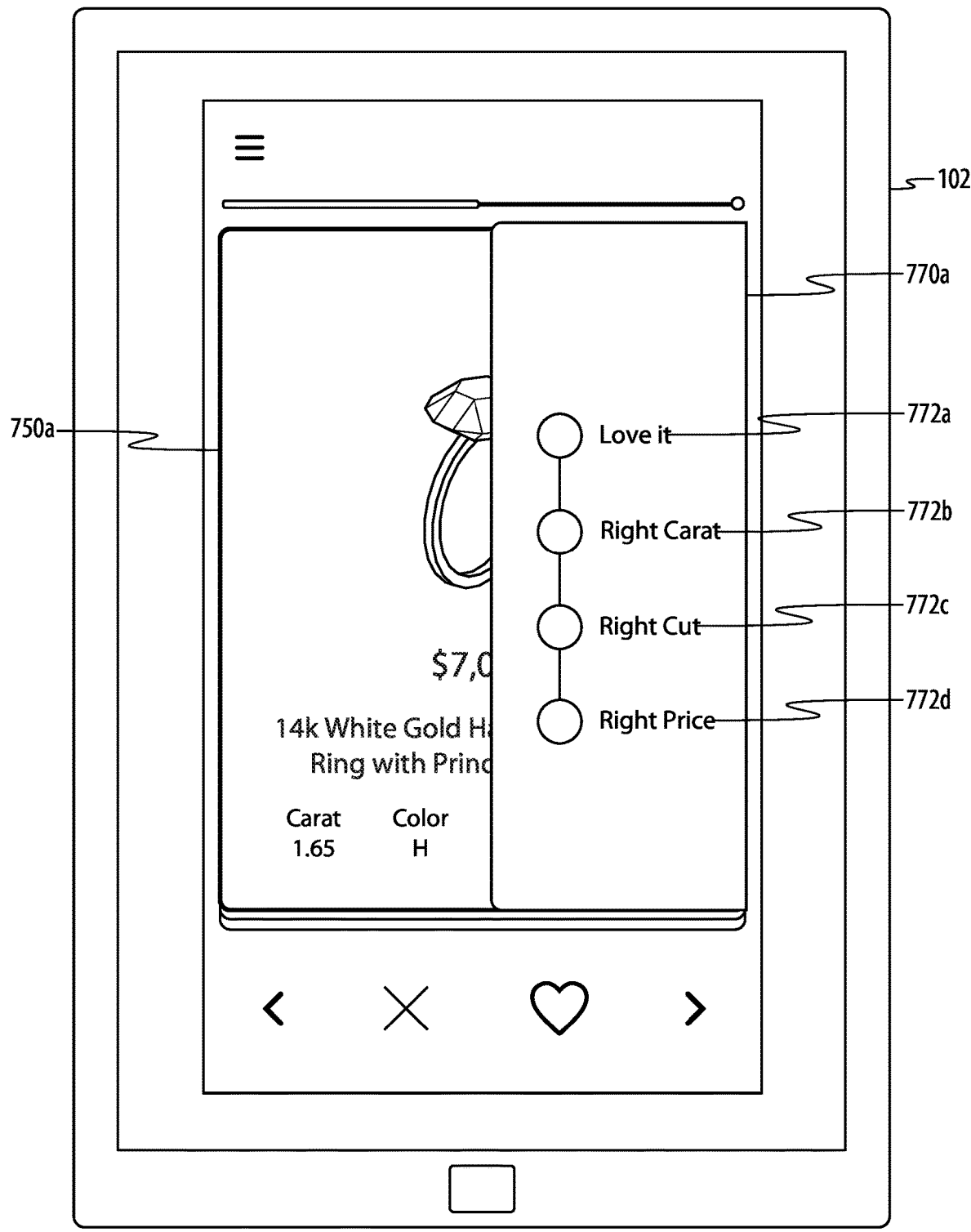
FIGS. 7D and 7E depict example ring listing feedback prompts displayed by the client application.
Figure 7E:
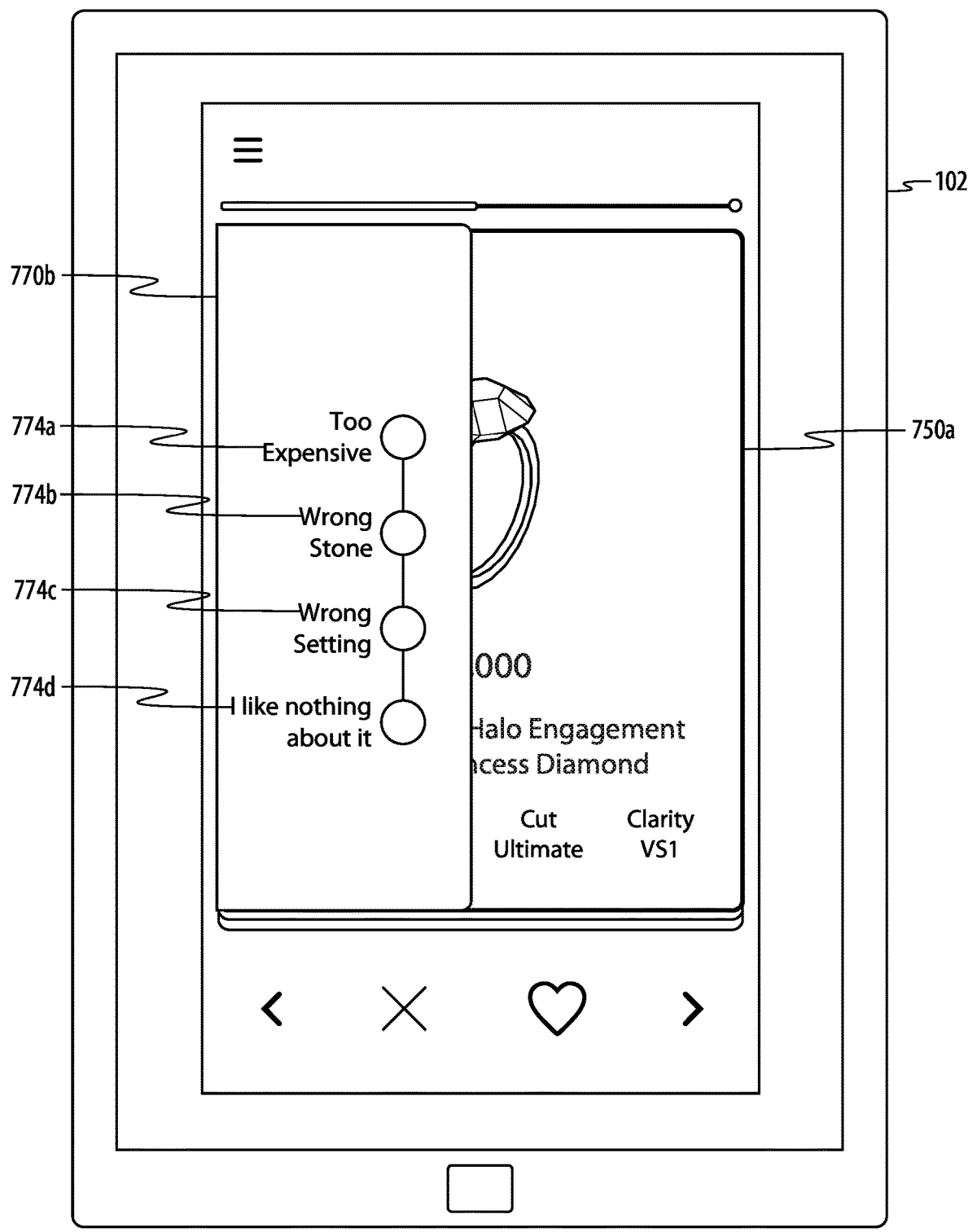

In some embodiments, the user may provide additional information regarding their selected preference for the ring listing 750a. For example, in response to a selection of a preference indicator and/or a gesture, the user interface may display a prompt that allows a user to provide additional information about the ring listing 750a. FIGS. 7D and 7E depict example ring listing feedback prompts 770a, 770b displayed in the user interface. The prompts 770a, 770b may provide one or more user-selectable options regarding the indicated preference. For example, as shown in FIG. 7D, in response to a user indicating a positive preference, the prompt 770a may provide user-selectable options 772a-d related to a user's reason for expressing a positive preference. Similarly, as shown in FIG. 7E, in response to a user indicating a negative preference, the prompt 770b may provide user-selectable options 774a-d related to a user's reason for expressing a negative preference. In various embodiments, the user may select one or more of the user-selectable options 772a-d, 774a-d to provide feedback to the diamond selection system. In some embodiments, in response to the user selecting a user-selectable option 772a-d, 774a-d, the ring selection system displays a new ring listing (e.g., ring listing 750b). In response to receiving a selection of a user-selectable option 772a-d, 774a-d, the ring selection system may modify or update search parameters, the subset of ring listings, and/or the presentation order.

As discussed above, in response to the search parameters being updated or modified, the ring selection system may determine a modified set of ring listings, a modified subset of ring listings, and/or a modified presentation order. This may occur while a user is still interacting with the user interface of the client application 104 and/or after the user's session has ended. In embodiments in which determining modified listings and/or presentation order occurs while a user is interacting with the user interface, the ring listings that are presented to the user may change based on the modifications. For example, if a presentation order is adjusted based on received user preferences or additional information, an original sequence of ring listings may be interrupted or replaced by a modified sequence of ring listings according to the adjusted presentation order.

Figure 8:
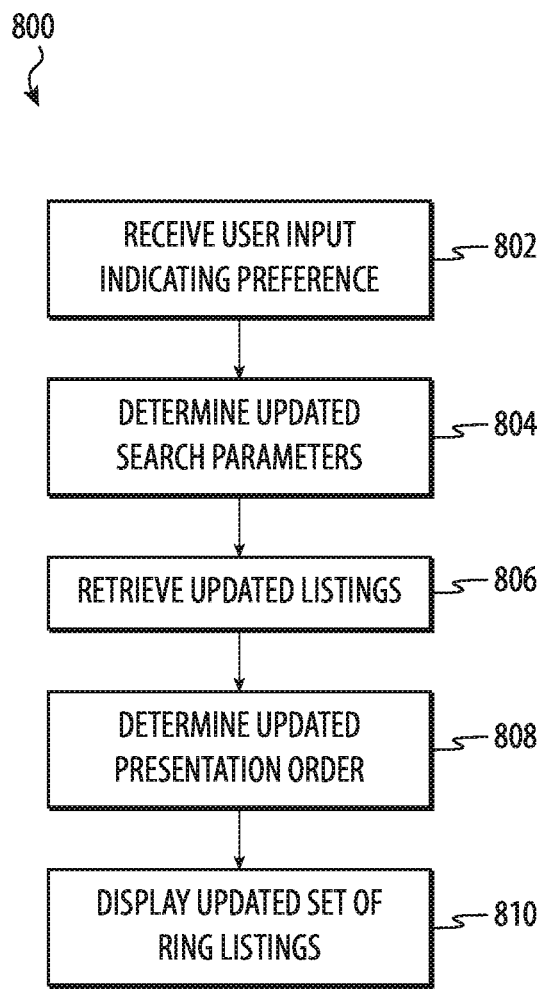
FIG. 8 is a flowchart of an example method for providing updated ring listings in response to receiving a user input.

FIG. 8 is a flowchart of an example method 800 for providing updated ring listings in response to receiving a user input. The method 800 may be operated on a ring selection system, such as the ring selection system 110. The method 800 may be a continuation of the method 200. At operation 802, one or more user inputs are received that indicate preference(s) regarding one or more ring listings displayed at the user interface. For example, the user input(s) may be swipe gestures or other inputs to the ring listing(s) as discussed above with respect to FIGS. 7A-7E. At operation 804, the ring selection system updates at least one of a modification metric or the search parameters based on the indicated preference or a series of preferences. Operation 804 may be triggered automatically and without additional intervention from the user (other than providing the preferences via the graphical user interface, as described previously). In some embodiments and as described previously, the diamond selection system determines whether one or more modification metrics exceed a predetermined threshold, and updates the search parameters in response to determining that the one or more modification metrics exceed the predetermined threshold. In some embodiments, the user input may directly correspond to an update of the search parameters.

At operation 806, the ring selection system may retrieve an updated set of ring listings. In some cases, the set of ring listings is selected using the updated search preferences. The updated set of ring listings may be retrieved by searching for ring, stone, and/or setting listings which match all the updated search parameters, ring, stone, and/or setting listings which match some of the updated search parameters, and/or ring, stone, and/or setting listings with values within a predetermined range of the updated search parameters. An updated search results list may be populated with the updated set of ring listings. In some embodiments, operation 806 is an optional step, and may be omitted from the method 800. In some embodiments, the ring selection system does not retrieve an updated set of ring listings and one or more subsequent operations are performed on a previous set of ring listings. In some embodiments, the ring selection system combines a previous set of ring listings with an updated set of ring listings.

At operation 808, the ring selection system may determine an updated presentation order based on the updated search parameters. In some embodiments, the updated search results may be organized or sorted into the updated presentation order. In some embodiments, the search results may be displayed according to the updated presentation order.

At operation 810, the client application may display the updated set of ring listings in the ring selection interface. This may include displaying ring listings from the updated set of ring listings similarly to the ring listings 750*a-d* shown and described with respect to FIGS. 7A-7E.

The method 800 shown and described with respect to FIG. 8 is one example of a method for providing updated listings in response to receiving a user input. In various embodiments, the method 800 may include different and/or additional operations, and certain operations may be performed in different orders and/or omitted from the method.

Figure 9:
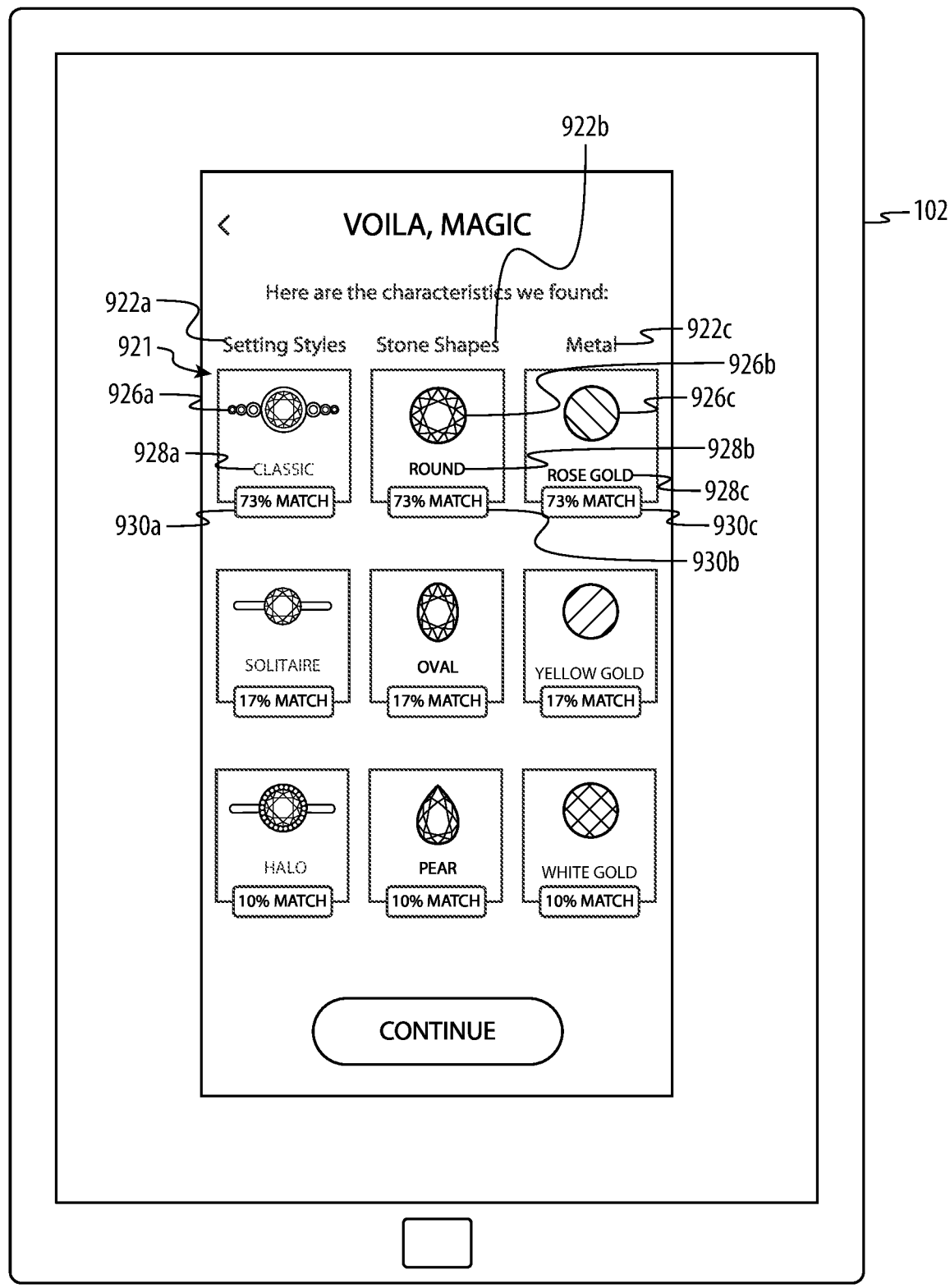
FIG. 9 depicts an example user interface for presenting one or more predicted stone and/or setting characteristics to users.

As noted herein, the ring selection systems described herein may determine stone and/or setting characteristics based on analyzing images. In some cases, the client application 104 may present one or more predicted stone and/or setting characteristics to users. FIG. 9 depicts an example user interface for presenting one or more predicted stone and/or setting characteristics to users. The user interface may provide one or more entries 921 for one or more categories of ring characteristics (e.g., setting style 922*a*, stone shape 922*b*, and metal 922*c*). Each entry 921 may include one or more of a ring attribute image 926*a*, 926*b*, 926*c*, a ring attribute descriptor 928*a*, 928*b*, 928*c*, or a prediction metric 930*a*, 930*b*, 930*c*. The entries may indicate a ring characteristic (e.g., a classic setting style) and a prediction metric for the ring characteristic (e.g., 73% prediction confidence). In some cases, the ring characteristics are sorted in order of a highest prediction metric, as shown in FIG. 9. In some cases, not all determined ring characteristics are displayed. While a confidence value is depicted in this example, other metrics or properties of the machine learning model may be depicted in order to indicate a quality or objective measure of the result.

In some cases, the interface of FIG. 9 can be used to collect feedback from the customer or a user training the system. For example, if the characteristics of the stone or setting are known, the user may select a respective displayed object indicating that the characteristic is correct. This user feedback may be used to train or reinforce one or more of the machine learning models used to identify the stone and/or setting. Similarly, the interface of FIG. 9 can be used to receive input with respect to characteristics that are not relevant or are incorrectly identified by the system, which may also be provided as feedback or training data for one or more of the machine learning models described herein.

Figure 10A:
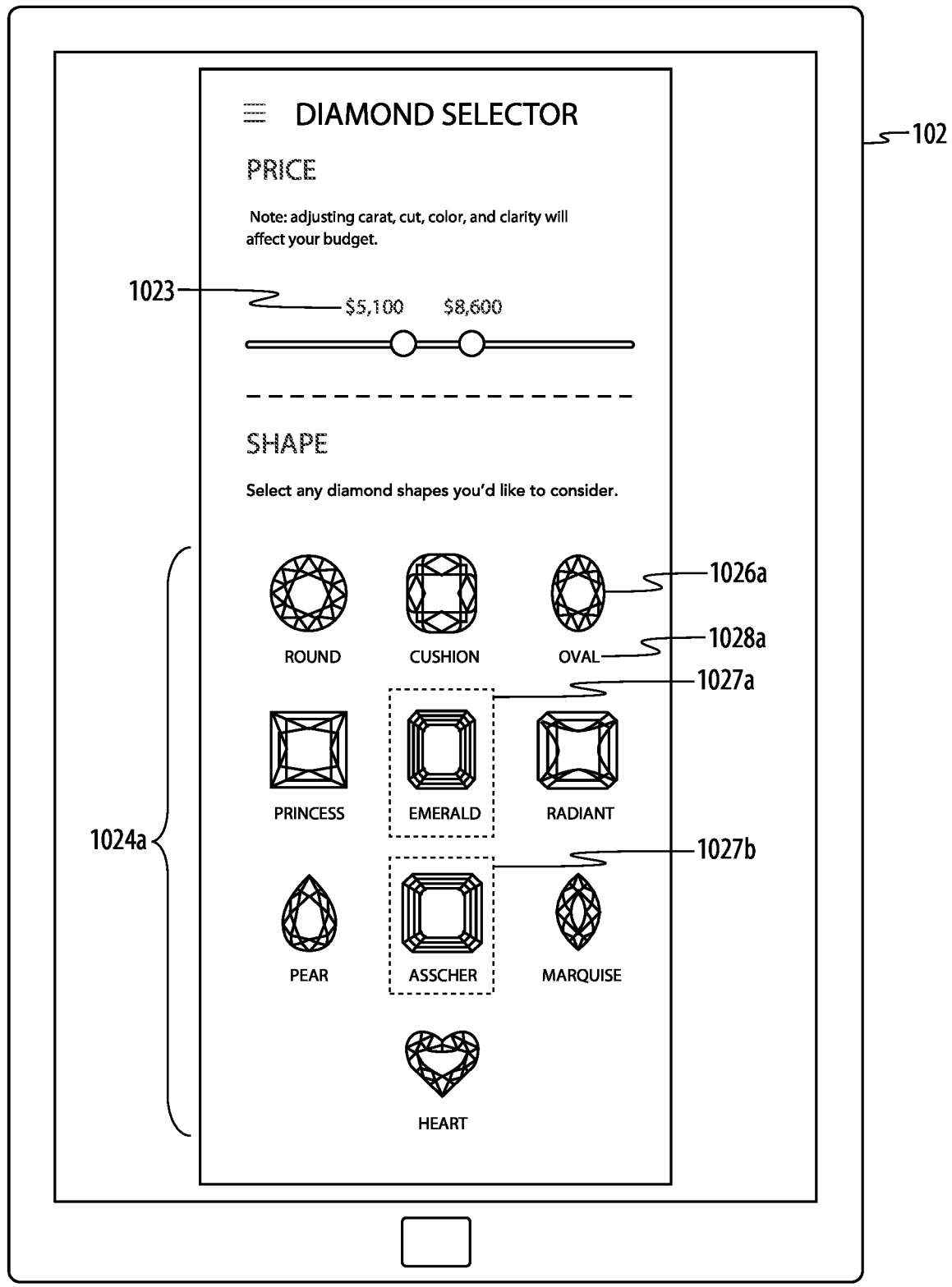
FIGS. 10A-11 depict example user interfaces for providing search parameters.

As noted herein, users of the ring selection system 110 may provide and/or update search parameters for a search via the client application. FIGS. 10A-11 depict example user interfaces for providing search parameters. The user interface may include selectable items that may be used to present search parameters to users and/or receive modifications to the search parameters from users for a search of the ring selection system. In some embodiments, one or more search parameters may be pre-selected or pre-populated, for example based on ring characteristics determined by the ring selection system.

Figure 10B:
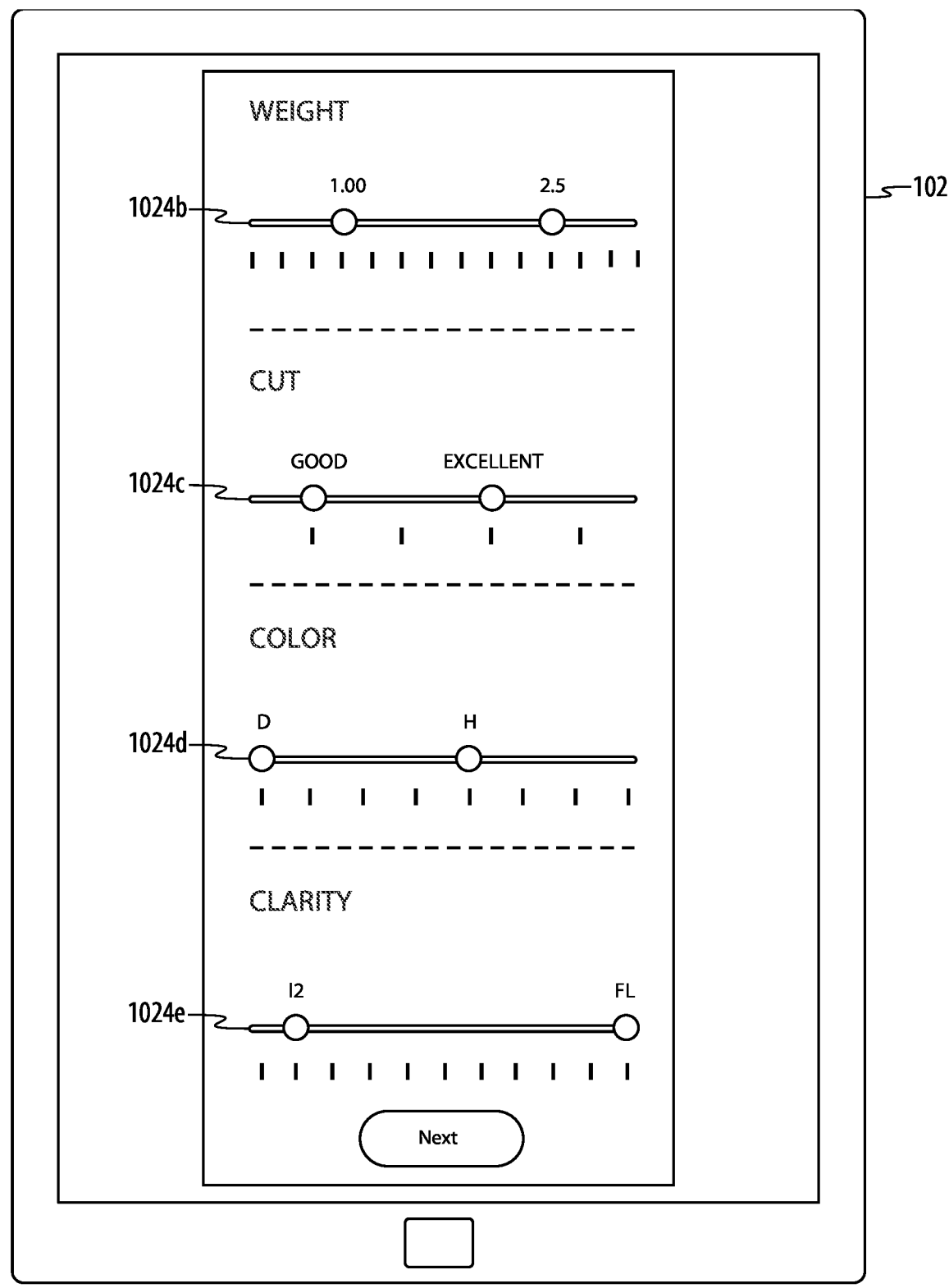
Figure 11:
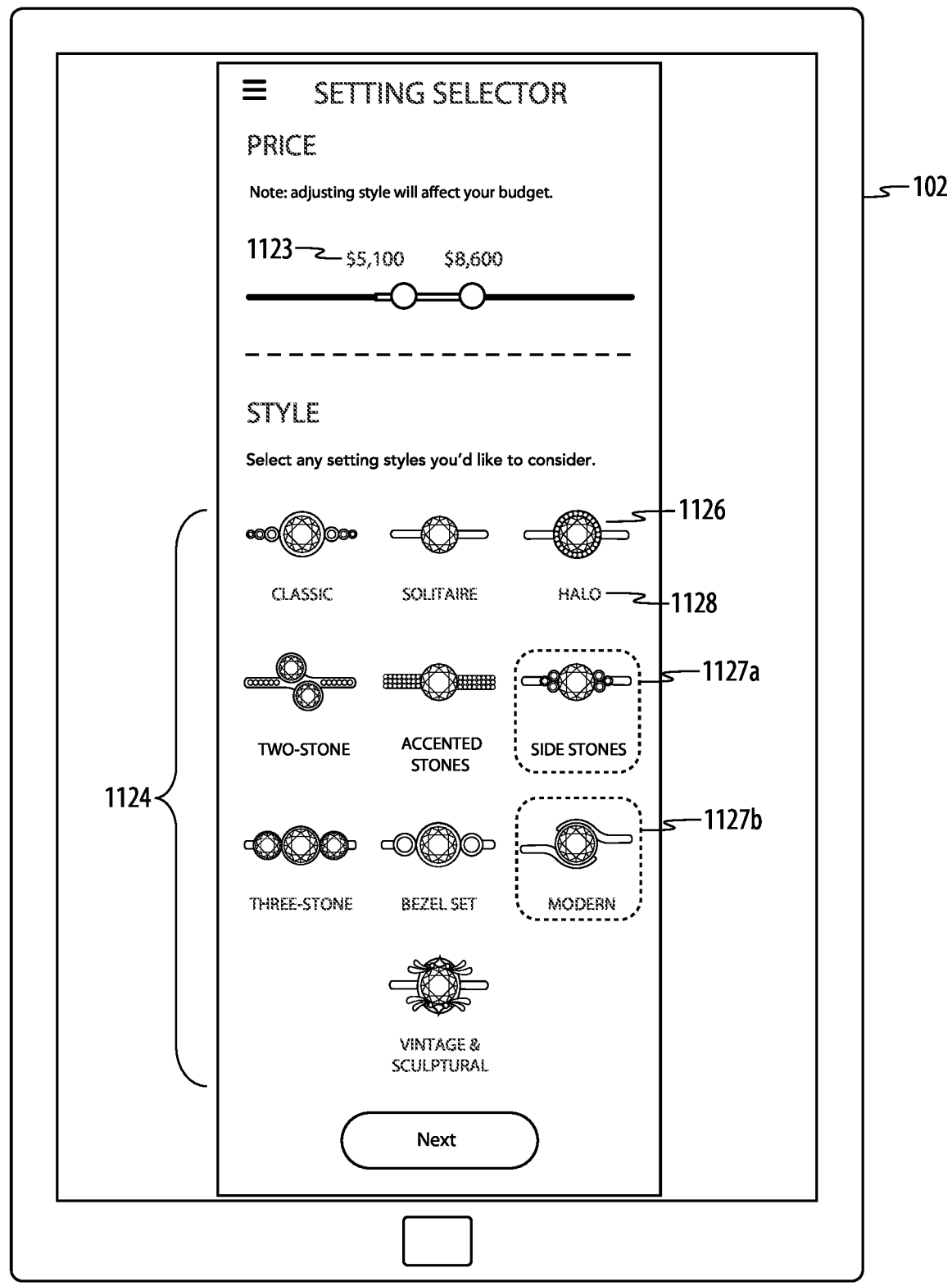

FIGS. 10A-10B depict an example user interface for providing search parameters relating to stone characteristics. The user interface may include a price element 1023 that may include a slider that allows a user to select a price range for the search. Another portion of the user interface may include searchable stone characteristics (e.g., diamond features) or search categories. In the present embodiment, the stone characteristics are represented by one or more corresponding selectable graphical elements. Each stone characteristic may include selectable search options 1024*a-e*, that correspond to a stone characteristic graded along a scale (e.g., a set of values). The scale may be continuous, graduated, or may correspond to a series of grades or values associated with the particular stone characteristic. The user may enter the search parameters by selecting one or more of the selectable search options 1024*a-e*. The stone characteristics may include a stone shape, weight (e.g., carat weight), cut, color, and clarity.

Regarding the stone shape category, the selectable search options 1024*a* may include an image (e.g., image 1026*a*) and/or text (e.g., text 1028*a*) for each shape. The user may select one or more shapes from the selectable text and/or images by interacting with the corresponding text and/or image. For example, a user that wishes to search for round shaped stones may select (e.g., by touching a corresponding region of a touch-sensitive display) the text and/or image corresponding to the round shape. In some embodiments, the user may select one option for shape, while in other embodiments the user may select multiple options for shape. As shown in FIG. 10A, the user interface may display indicators (e.g., 1027*a* and 1027*b*) that indicate a selected shape (either by user selection or pre-selection). In some cases, users may select a selected shape to de-select the shape, which may remove the indicator.

Turning to FIG. 10B, additional stone characteristics and corresponding selectable search options 1024*b-e* are shown. Regarding the weight category, the selectable search options 1024*b* may include a slider or other input element that allows a user to select a range of weights. Regarding the cut category, the selectable search options 1024*c* may include a slider or other input element that allows a user to select one or more or a range of cut qualities. Regarding the color category, the selectable search options 1024*d* may include a slider or other input element that allows a user to select one or more or a range of colors. Regarding the clarity category, the selectable search options 1024*e* may include a slider or other input element that allows a user to select one or more or a range of clarity ratings.

FIG. 11 depicts an example user interface for providing search parameters relating to setting characteristics. The user interface may include a price element 1123 that may include a slider that allows a user to select a price range for the search. Another portion of the user interface may include searchable setting characteristics or search categories. In the present embodiment, the setting characteristics are represented by one or more corresponding selectable graphical elements. Each setting characteristic may include selectable search options 1124, that correspond to a setting style. Other setting characteristics may be included in various embodiments, including colors, materials and the like.

Regarding the setting style category, the selectable search options 1124 may include an image (e.g., image 1126) and/or text (e.g., text 1128) for each setting style. The user may select one or more setting styles from the selectable text and/or images by interacting with the corresponding text and/or image. For example, a user that wishes to search for a halo setting may select (e.g., by touching a corresponding region of a touch-sensitive display) the text and/or image corresponding to the halo setting. In some embodiments, the user may select one option for setting style, while in other embodiments the user may select multiple options for setting style. As shown in FIG. 11, the user interface may display indicators (e.g., 1127a and 1127b) that indicate a selected setting style (either by user selection or pre-selection). In some cases, users may select a selected shape to de-select the setting style, which may remove the indicator.

Figure 12A:
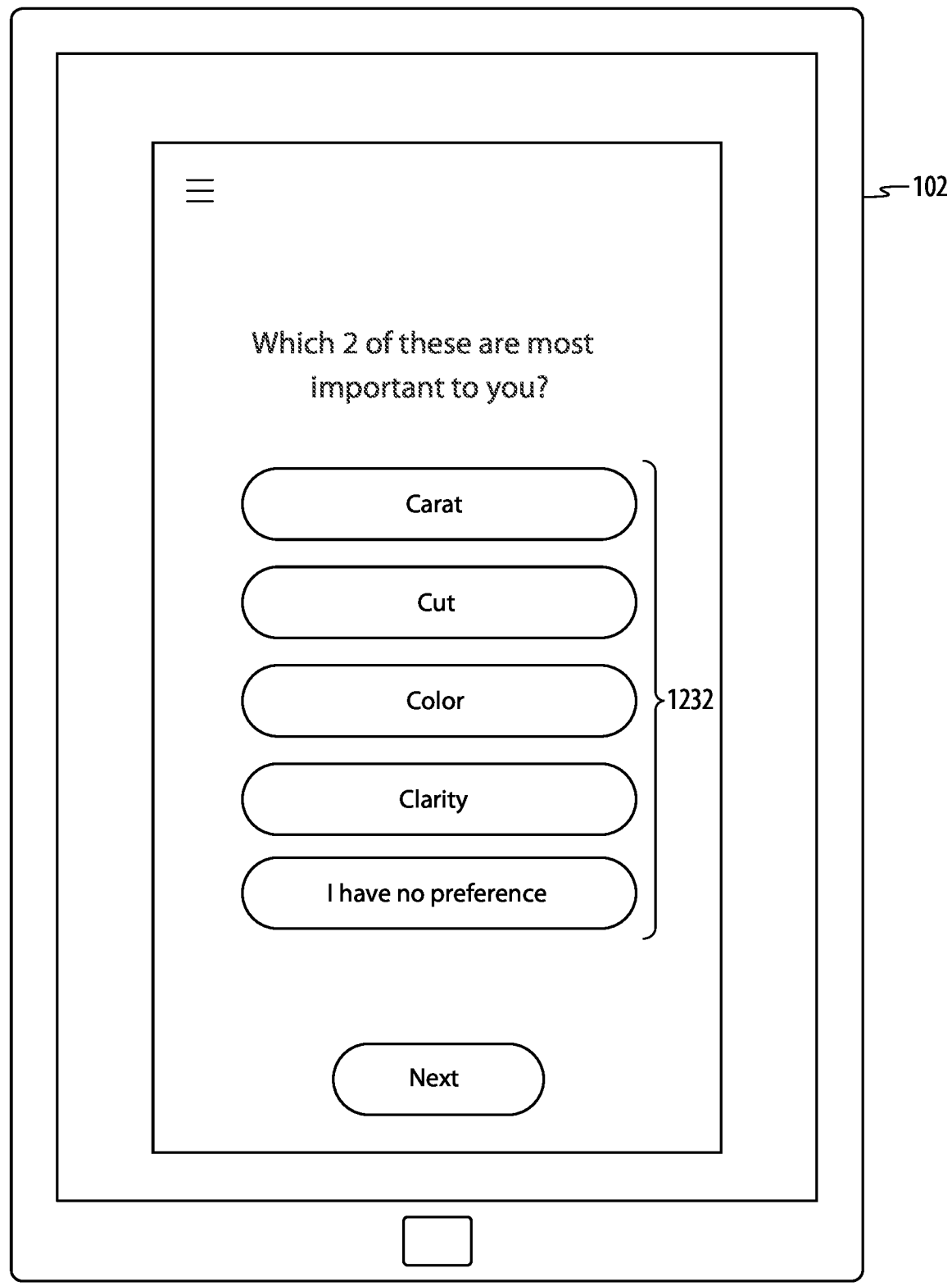
FIGS. 12A-12B depict example user interfaces for providing a relative ranking between different ring characteristics.
Figure 12B:
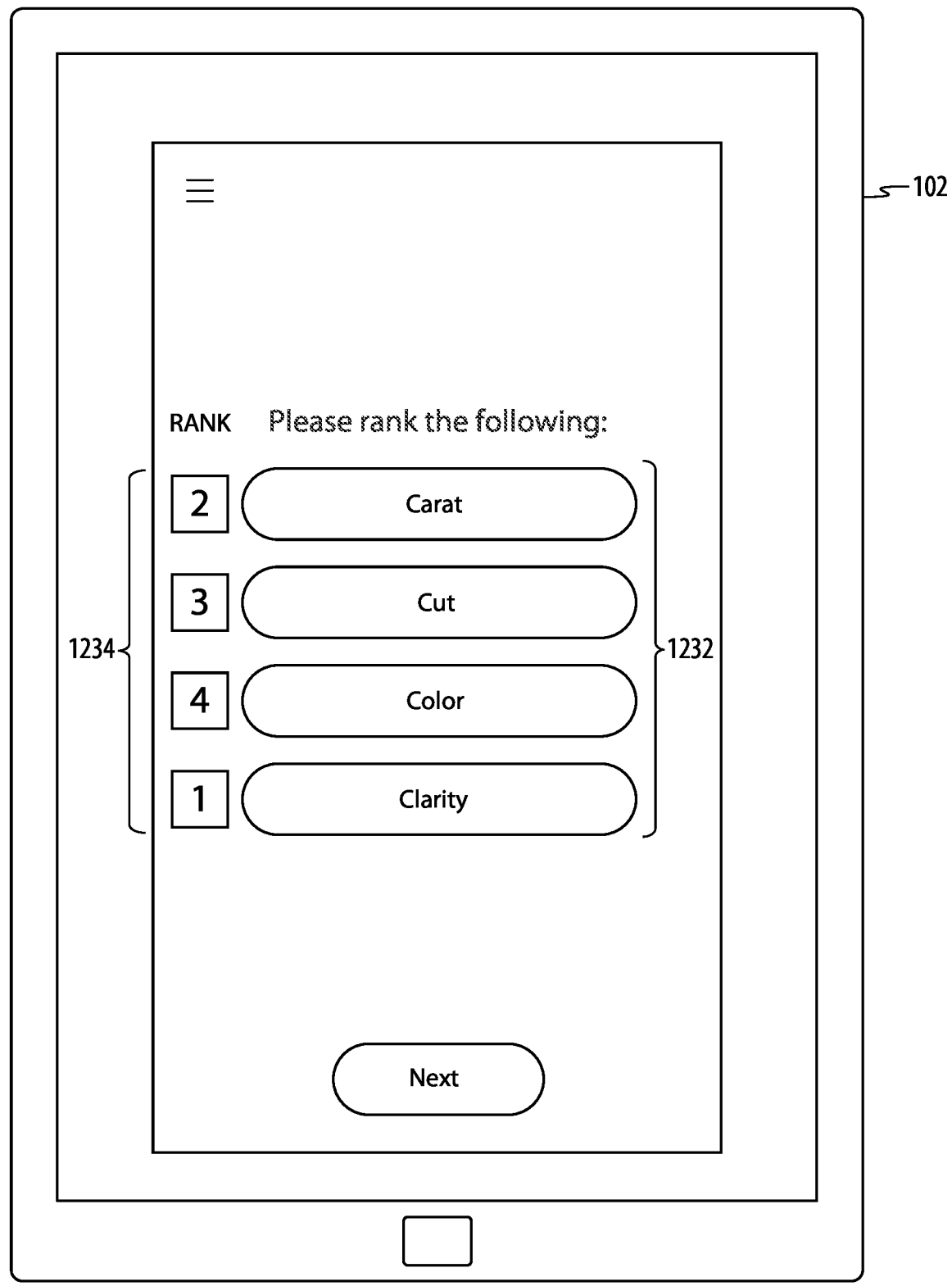

As noted herein, users of the ring selection system 110 may provide a relative ranking between different ring characteristics for use in determining ring listings and/or a presentation order of ring listings. FIGS. 12A-12B depict example user interfaces for providing a relative ranking between different ring characteristics. As shown in FIG. 12A, the ring selection system may prompt a user to select a number of ring characteristics 1232 that are most important to the user. As shown in FIG. 12B, the ring selection system may prompt a user to provide a relative ranking 1234 of a number of ring characteristics 1232.

Figure 13:
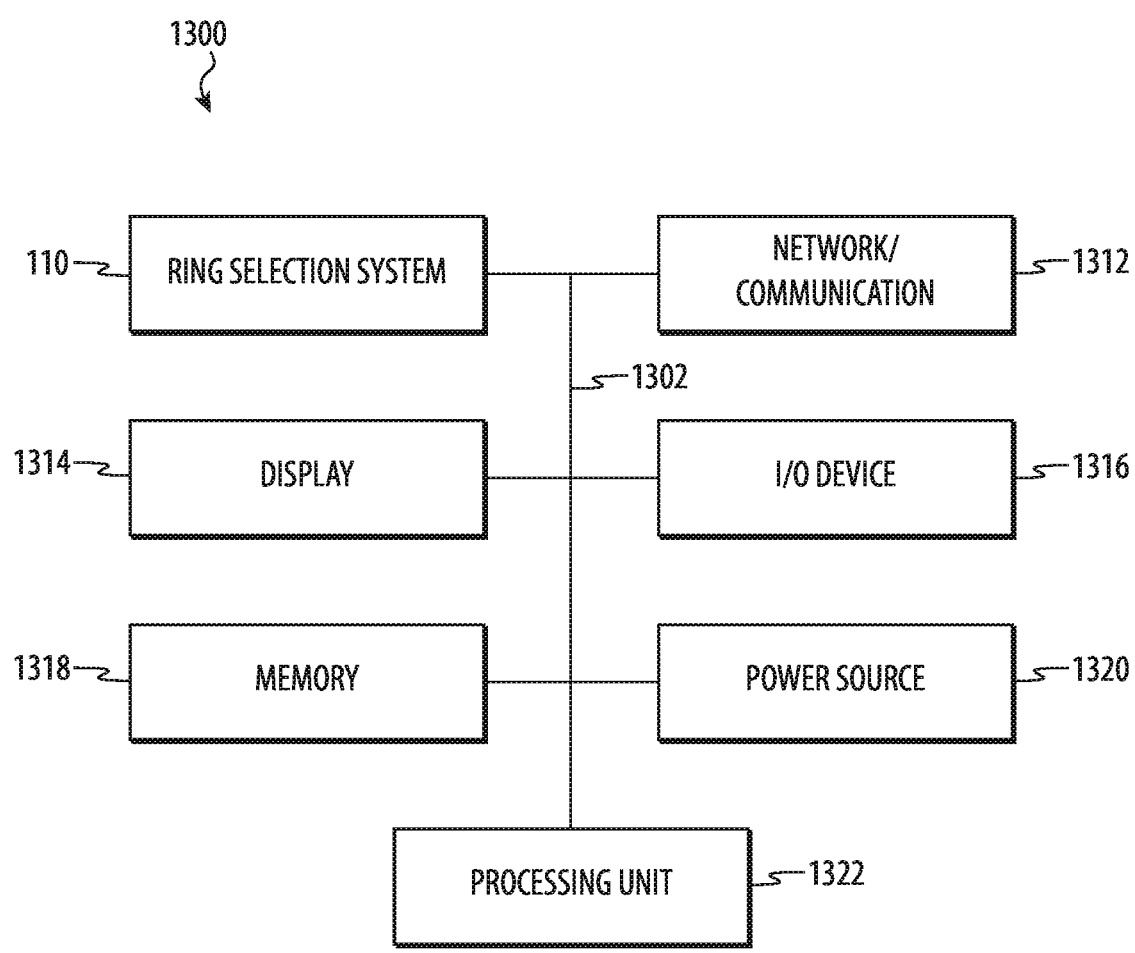
FIG. 13 is an illustrative block diagram of an electronic device.

FIG. 13 is an illustrative block diagram of an electronic device 1300. The electronic devices (e.g., client devices 102), systems (e.g., ring selection system 110), and/or services described herein (e.g., the host service 112, the ring identification service 114, the one or more model services 116, and the one or more feedback services 118) may include some or all of the components described with respect to the electronic device 1300. The electronic device 1300 can include a network communications interface 1312, a display 1314, one or more input/output (I/O) devices 1316, memory 1318, a power source 1320, and/or one or more processing units 1322. As shown in FIG. 13, the electronic device 1300 may include one or more components of the ring selection system 110 as described herein.

The display 1314 may provide an image or graphical output (e.g., computer-generated image data) for the electronic device. The display may also provide an input surface for one or more input devices, such as, for example, a touch sensing device and/or a fingerprint sensor. The display 1314 may be substantially any size and may be positioned substantially anywhere on the electronic device. The display 1314 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. The display 1314 provides a graphical output, for example, associated with an operating system, user interface, and/or applications of the electronic device 1300. In some embodiments, the display 1314 is configured as a touch-sensitive (e.g., single-touch, multi-touch) and/or force-sensitive display to receive inputs from a user. In some embodiments, the touch-sensitive display includes one or more sensors (e.g., capacitive touch sensors, ultrasonic sensors, or other touch sensors) positioned above, below, or integrated with the display. In various embodiments, a graphical output of the display 1314 is responsive to inputs provided to the electronic device 1300.

The processing unit 1322 can control some or all of the operations of the electronic device. The processing unit 1322 can communicate, either directly or indirectly, with substantially all of the components of the electronic device. For example, a system bus or signal line 1302 or other communication mechanisms (e.g., electronic connectors) can provide communication between the processing unit(s) 1322, the memory 1318, the I/O device(s) 1316, the power source 1320, and/or the network communications interface 1312.

The one or more processing units 1322 can be implemented as any electronic device capable of processing, receiving, or transmitting data or instructions. For example, the processing unit(s) 1322 can each be a microprocessor, a graphics processing unit (GPU), a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 1318 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 1318 can be configured as any type of memory. By way of example only, the memory can be implemented as random access memory, read-only memory, Flash memory, removable memory, or other types of storage elements, or combinations of such devices.

The one or more I/O devices 1316 can transmit and/or receive data to and from a user or another electronic device. The I/O device(s) 1316 can include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard.

The power source 1320 can be implemented with any device capable of providing energy to the electronic device. For example, the power source 1320 can be one or more batteries or rechargeable batteries, or a connection cable that connects the electronic device to another power source such as a wall outlet.

The network communication interface 1312 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 13 is for illustrative purposes only. In other examples, an electronic device may include fewer or more components than those shown in FIG. 13. Additionally or alternatively, the electronic device can be included in a system, and one or more components shown in FIG. 13 are separate from the electronic device but included in the system. For example, an electronic device may be operatively connected to, or in communication with, a separate display. As another example, one or more applications can be stored in a memory separate from the wearable electronic device. The processing unit in the electronic device can be operatively connected to and in communication with the separate display and/or memory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

In particular, while some above examples are described with respect to a system for searching for diamonds, this disclosure is not limited to diamonds alone, but can also be extended to systems which incorporate other gemstones (e.g., precious gems). Typically, a search system according to the present disclosure will search for gemstones having features which similarly have varying qualities, such as the quality of cut, the clarity of the gemstone, the size and/or weight of the gemstone, and similar features. Examples may include, but are not limited to, beryl gems (e.g., emerald and aquamarine), amethyst, quartz, corundum (e.g., sapphire and ruby), alexandrite, zircon, and so on. Further, this disclosure can be extended to systems which incorporate other jewelry items, including settings, rings, pendants, bracelets, necklaces, earrings, and the like. The systems and techniques described herein may also be applied to other articles for purchase including various retail items and other goods offered for sale that have a variety of characteristics or qualities that may be searched and selected in accordance with the embodiments described herein.

What is claimed is:

1. A computer-implemented method for extracting sets of characteristics for a composite object using machine learning models, the computer-implemented method comprising:
    receiving, via a ring selection interface accessible by a client device, a request to view listings of a ring selection system that correspond to the composite object displayed in an image, the image comprising multiple objects including the composite object, the composite object comprising a stone and a setting, and the request comprising an image universal resource locator (URL);
    in response to receiving the request, obtaining the image using the image URL;
    processing the image using a ring identification service to determine ring characteristics of the composite object, processing the image comprising:
        defining, using a stone-locating machine learning model deployed to the ring identification service, a first bounding box that surrounds a stone portion of the image;
        determining a set of stone characteristics by applying a stone-classifying machine learning model deployed to the ring identification service to contents of the first bounding box;
        defining, using a setting-locating machine learning model deployed to the ring identification service, a second bounding box that surrounds a setting portion of the image; and
        determining a set of setting characteristics by applying a setting-classifying machine learning model deployed to the ring identification service to contents of the second bounding box;
    determining a set of ring listings using the set of stone characteristics and the set of setting characteristics; and
    causing display of at least a portion of the set of ring listings in the ring selection interface;
wherein:
    the setting-classifying machine learning model comprises a convolutional neural network (CNN); and
    determining the set of setting characteristics comprises:
        determining an output of a next-to-last layer of the CNN to obtain a feature vector corresponding to the image;
        comparing the feature vector to a set of cluster centroids of a set of model clusters determined during a training process of the setting-classifying machine learning model, each model cluster corresponding to a different setting characteristic value;
        determining a closest cluster centroid of the set of cluster centroids; and
        determining a setting characteristic value corresponding to the closest cluster centroid.

2. The method of claim 1, wherein the stone-locating machine learning model is trained using labelled images depicting stones.

3. The method of claim 1, wherein training the setting-classifying machine learning model comprises:
    obtaining a training feature vector for each training image in a set of training images;
    combining training feature vectors for each training image into a matrix;
    determining the set of model clusters by applying a clustering algorithm to the matrix; and
    computing a cluster centroid for each model cluster in the set of model clusters.

4. A computer-implemented method for extracting sets of characteristics for a composite object using machine learning models, the computer-implemented method comprising:
    receiving, via a ring selection interface accessible by a client device, a request to view listings of a ring selection system that correspond to the composite object displayed in an image, the image comprising multiple objects including the composite object, the composite object comprising a stone and a setting, and the request comprising an image universal resource locator (URL);
    in response to receiving the request, obtaining the image using the image URL;
    processing the image using a ring identification service to determine ring characteristics of the composite object, processing the image comprising:
        defining, using a stone-locating machine learning model deployed to the ring identification service, a first bounding box that surrounds a stone portion of the image;
        determining a set of stone characteristics by applying a stone-classifying machine learning model deployed to the ring identification service to contents of the first bounding box;
        defining, using a setting-locating machine learning model deployed to the ring identification service, a second bounding box that surrounds a setting portion of the image; and
        determining a set of setting characteristics by applying a setting-classifying machine learning model deployed to the ring identification service to contents of the second bounding box;
    determining a set of ring listings using the set of stone characteristics and the set of setting characteristics; and
    causing display of at least a portion of the set of ring listings in the ring selection interface; wherein:

the stone-locating machine learning model comprises a first single-stage object detector;

the setting-locating machine learning model comprises a second single-stage object detector;

the stone-classifying machine learning model comprises a first convolutional neural network having at least one of an adjustable depth, an adjustable width, or an adjustable resolution; and the setting-classifying machine learning model comprises a second convolutional neural network and a clustering algorithm.

5. The method of claim 1, wherein a first runtime of the stone-classifying machine learning model overlaps with at least one of:

a second runtime of the setting-locating machine learning model; or a third runtime of the setting-classifying machine learning model.

6. The method of claim 1, wherein the first bounding box and the second bounding box overlap.

7. The method of claim 1, wherein the defining the second bounding box is based on a location of the first bounding box.

8. A ring selection system for providing a ring listing that corresponds to a composite object in an image, the ring selection system comprising:

a host service configured to:
  provide multiple instances of a client application, each instance of the client application configured to provide a ring selection interface accessible at a client device; and
  receive, via the ring selection interface, a request to view listings of the ring selection system that correspond to the composite object in the image, the composite object depicting a ring and other non-ring objects, the ring comprising a stone depicted in a stone portion of the image and a setting depicted in a setting portion of the image;

a model service configured to implement a set of machine learning models within separate container environments; and a ring identification service operably coupled to the host service and the model service and configured to:
  obtain the image;
  transmit a first request to the model service to deploy a stone-locating machine learning model of the set of machine learning models to the ring identification service;
  define, using the stone-locating machine learning model, a first bounding box that surrounds the stone portion of the image;
  transmit a second request to the model service to deploy a setting-locating machine learning model of the set of machine learning models to the ring identification service;
  define, using the setting-locating machine learning model, a second bounding box that surrounds the setting portion of the image;
  transmit a third request to the model service to deploy a stone-classifying machine learning model of the set of machine learning models to the ring identification service;
  apply the stone-classifying machine learning model to contents of the first bounding box to determine a set of stone characteristics;
  transmit a fourth request to the model service to deploy a setting-classifying machine learning model of the set of machine learning models to the ring identification service; and
  apply the setting-classifying machine learning model to contents of the second bounding box to determine a set of setting characteristics; wherein:

the host service is further configured to:
  determine, based on the set of stone characteristics and the set of setting characteristics, a set of ring listings for presentation in the ring selection interface; and
  cause at least a portion of the set of ring listings to be displayed in the ring selection interface;

wherein:
the set of stone characteristics comprises a stone shape;
the set of setting characteristics comprises a setting style;
the ring identification service is further configured to determine, using the stone-classifying machine learning model, that the stone shape cannot be determined; and
in accordance with the ring identification service determining that the stone shape cannot be determined, the host service is configured to determine the set of ring listings based on the setting style.

9. The ring selection system of claim 8, wherein the stone-classifying machine learning model is trained using a training data set comprising labelled images from categories of stone shapes.

10. A ring selection system for providing a ring listing that corresponds to a composite object in an image, the ring selection system comprising:

a host service configured to:
  provide multiple instances of a client application, each instance of the client application configured to provide a ring selection interface accessible at a client device; and
  receive, via the ring selection interface, a request to view listings of the ring selection system that correspond to the composite object in the image, the composite object depicting a ring and other non-ring objects, the ring comprising a stone depicted in a stone portion of the image and a setting depicted in a setting portion of the image;

a model service configured to implement a set of machine learning models within separate container environments; and a ring identification service operably coupled to the host service and the model service and configured to:
  obtain the image;
  transmit a first request to the model service to deploy a stone-locating machine learning model of the set of machine learning models to the ring identification service;
  define, using the stone-locating machine learning model, a first bounding box that surrounds the stone portion of the image;
  transmit a second request to the model service to deploy a setting-locating machine learning model of the set of machine learning models to the ring identification service;
  define, using the setting-locating machine learning model, a second bounding box that surrounds the setting portion of the image;
  transmit a third request to the model service to deploy a stone-classifying machine learning model of the set of machine learning models to the ring identification service;

apply the stone-classifying machine learning model to contents of the first bounding box to determine a set of stone characteristics;

transmit a fourth request to the model service to deploy a setting-classifying machine learning model of the set of machine learning models to the ring identification service; and apply the setting-classifying machine learning model to contents of the second bounding box to determine a set of setting characteristics; wherein:

the host service is further configured to:

determine, based on the set of stone characteristics and the set of setting characteristics, a set of ring listings for presentation in the ring selection interface; and cause at least a portion of the set of ring listings to be displayed in the ring selection interface;

wherein:

the set of stone characteristics comprises a stone shape;

the set of setting characteristics comprises a setting style;

the ring identification service is further configured to determine, using the setting-classifying machine learning model, that the setting style cannot be determined; and in accordance with the ring identification service determining that the setting style cannot be determined, the host service is configured to determine the set of ring listings based on the stone shape.

11. The ring selection system of claim 8, wherein the determining the set of stone characteristics comprises classifying a stone shape of the stone as one of emerald, cushion, oval, princess, round, or other.

12. The ring selection system of claim 8, wherein the determining the set of setting characteristics comprises classifying a setting style of the stone as one of a set of setting styles, each setting style of the set of setting styles corresponding to a cluster determined during model training.

13. The ring selection system of claim 12, wherein the set of setting styles comprises bezel set, halo, modern, pave, side stones, solitaire, three stone, two stone, and vintage.

14. The ring selection system of claim 8, wherein the request to view the listings of the ring selection system comprises image data for the image.

15. A method for identifying a composite object in an image, the method comprising:

providing, at a client application, a ring selection interface accessible by a client device;

receiving, via the ring selection interface:

the image depicting the composite object, the composite object comprising a ring comprising a stone and a setting, the image comprising a stone portion corresponding to the stone and a setting portion corresponding to the setting; and a request to view, in the ring selection interface, one or more listings of a ring selection system that match the ring;

in response to the request to view the one or more listings, causing deployment of a ring identification service of the ring selection system, the ring identification service configured to:

deploy a stone-locating machine learning model;

apply the stone-locating machine learning model to the image to define a first bounding box that surrounds the stone portion of the image;

deploy a setting-locating machine learning model to the ring identification service;

apply the setting-locating machine learning model to the image to define a second bounding box that surrounds the setting portion of the image;

deploy a stone-classifying machine learning model to the ring identification service;

apply the stone-classifying machine learning model to contents of the first bounding box to determine a stone shape of the stone;

deploy a setting-classifying machine learning model to the ring identification service;

apply the setting-classifying machine learning model to contents of the second bounding box to determine a setting style of the setting; and determine a set of ring listings for presentation in the ring selection interface, the set of ring listings corresponding to rings having the stone shape and the setting style; and displaying at least a portion of the set of ring listings in the ring selection interface;

wherein:

the stone-locating machine learning model comprises a first single-stage object detector;

the setting-locating machine learning model comprises a second single-stage object detector:

the stone-classifying machine learning model comprises a first convolutional neural network having at least one of an adjustable depth, an adjustable width, or an adjustable resolution; and the setting-classifying machine learning model comprises a second convolutional neural network and a clustering algorithm.

16. The method of claim 15, wherein the stone-locating machine learning model is trained using labelled images depicting stones.

17. The method of claim 15, wherein a first runtime of the stone-locating machine learning model overlaps with at least one of:

a second runtime of the setting-locating machine learning model; or a third runtime of the setting-classifying machine learning model.

18. The method of claim 15, wherein:

the method further comprises receiving user search parameters via the ring selection interface; and determining the set of ring listings is based on the user search parameters.

19. The method of claim 15, wherein the determining the stone shape further comprises:

determining a confidence value corresponding to a predicted stone shape determined by the stone-classifying machine learning model; and in accordance with the confidence value meeting or exceeding a confidence value threshold, determining that the stone shape is the predicted stone shape.

20. The method of claim 15, wherein the determining the setting style further comprises;

determining a confidence value corresponding to a predicted setting style predicted by the setting-classifying machine learning model; and in accordance with the confidence value being at or above a confidence value threshold, determining that the setting style is the predicted setting style.

* * * * *